US012809770B2

(12) United States Patent
Kuhara et al.

(10) Patent No.: US 12,809,770 B2
(45) Date of Patent: Nov. 24, 2026

(54) MEMORY SYSTEM

(71) Applicant: Kioxia Corporation, Tokyo (JP)

(72) Inventors: Ryohichi Kuhara, Minato Tokyo (JP); Satoru Nakagawa, Fujisawa Kanagawa (JP); Yoshiyuki Kudoh, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 19/075,863

(22) Filed: Mar. 11, 2025

(65) Prior Publication Data

US 2026/0072825 A1 Mar. 12, 2026

(30) Foreign Application Priority Data

Sep. 10, 2024 (JP) ................................ 2024-156531

(51) Int. Cl.
*G06F 12/02* (2006.01)

(52) U.S. Cl.
CPC ................................ *G06F 12/0246* (2013.01)

(58) Field of Classification Search
CPC .................................................. G06F 12/0246
USPC ........................................................... 726/26
See application file for complete search history.

(56) References Cited

U.S. PATENT DOCUMENTS 7,201,659 B2 * 4/2007 Nakayama .............. A63F 13/77 463/43
7,447,908 B2 * 11/2008 Lapstun ................ H04L 9/3247 358/1.14
2011/0154059 A1 * 6/2011 Durham .................. G06F 21/79 711/163
2014/0208434 A1 * 7/2014 Brouwer ................. H04L 63/10 726/26
2014/0237611 A1 * 8/2014 Dent ......................... H04L 9/14 726/26
2017/0293575 A1 * 10/2017 Best ................... G11C 13/0059
2019/0147142 A1 * 5/2019 Ge ...................... G06F 21/1086 726/26
2020/0244458 A1 7/2020 Kanbe
(Continued)

FOREIGN PATENT DOCUMENTS

JP 2020119298 A 8/2020

OTHER PUBLICATIONS

NVM Express, Inc., NVM Express® Base Specification, Revision 2.1, Aug. 5, 2024, 707 pages.
(Continued)

*Primary Examiner* — Teshome Hailu
(74) *Attorney, Agent, or Firm* — Maier & Maier, PLLC

(57) ABSTRACT

A memory system includes a controller. The controller manages authentication information associated with a user ID. The controller generates a first authenticator associated with the user ID and transmits the first authenticator to a host. The controller receives an access command that includes the user ID and a second authenticator. The controller verifies authenticity of the second authenticator by using at least the authentication information and the first authenticator. When the authenticity of the second authenticator has been confirmed, the controller executes a process in accordance with the access command. When the authenticity of the second authenticator has not been confirmed, the controller does not execute the process.

19 Claims, 26 Drawing Sheets

(56) References Cited

U.S. PATENT DOCUMENTS

| | | | |
|---|---|---|---|
| 2020/0293206 | A1 | 9/2020 | Isozaki et al. |
| 2021/0141910 | A1 | 5/2021 | Numata |

OTHER PUBLICATIONS

Trusted Computing Group (TCG), TCG Storage Security Subsystem Class: Opal, Version 2.02, Revision 1.0, Jan. 24, 2022, 92 pages.

Trusted Computing Group (TCG), TCG Storage Security Subsystem Class (SSC): Key Per I/O, Version 1.00, Revision 1.41, Sep. 1, 2023, 158 pages.

* cited by examiner

| user ID | authentication information | range information | converted authentication information | user authenticator | expiration date | ... |
|---|---|---|---|---|---|---|
| user1 | pin1 | range1 | c_pin1 | aid1 | exp1 | ... |
| user2 | pin2 | range2 | c_pin2 | aid2 | exp2 | ... |
| ... | ... | ... | ... | ... | ... | ... |

FIG. 2

MEMORY SYSTEM

CROSS-REFERENCE TO RELATED APPLICATIONS

This application is based upon and claims the benefit of priority from Japanese Patent Application No. 2024-156531, filed Sep. 10, 2024, the entire contents of which are incorporated herein by reference.

FIELD

Embodiments described herein relate generally to a technology for controlling nonvolatile memory.

BACKGROUND

In recent years, memory systems that include a nonvolatile memory have been widely used. As one of such memory systems, a solid state drive (SSD) that includes a NAND flash memory is known. The SSD is used as a main storage for various computing devices.

In order to prevent data leakage and the like, a memory system may have a self-encrypting function of automatically encrypting data at the time of writing. The memory system having the self-encrypting function is also referred to as a self-encrypting drive (SED).

One of security standards to which the SED should conform is the Trusted Computing Group (TCG) standard. The TCG standard specifies, for example, data encryption and access control for each partial range in storage.

BRIEF DESCRIPTION OF THE DRAWINGS

FIG. 2 is a diagram illustrating an example of a configuration of a user management table that is used in the memory system according to the first embodiment.

DETAILED DESCRIPTION

Figure 1:
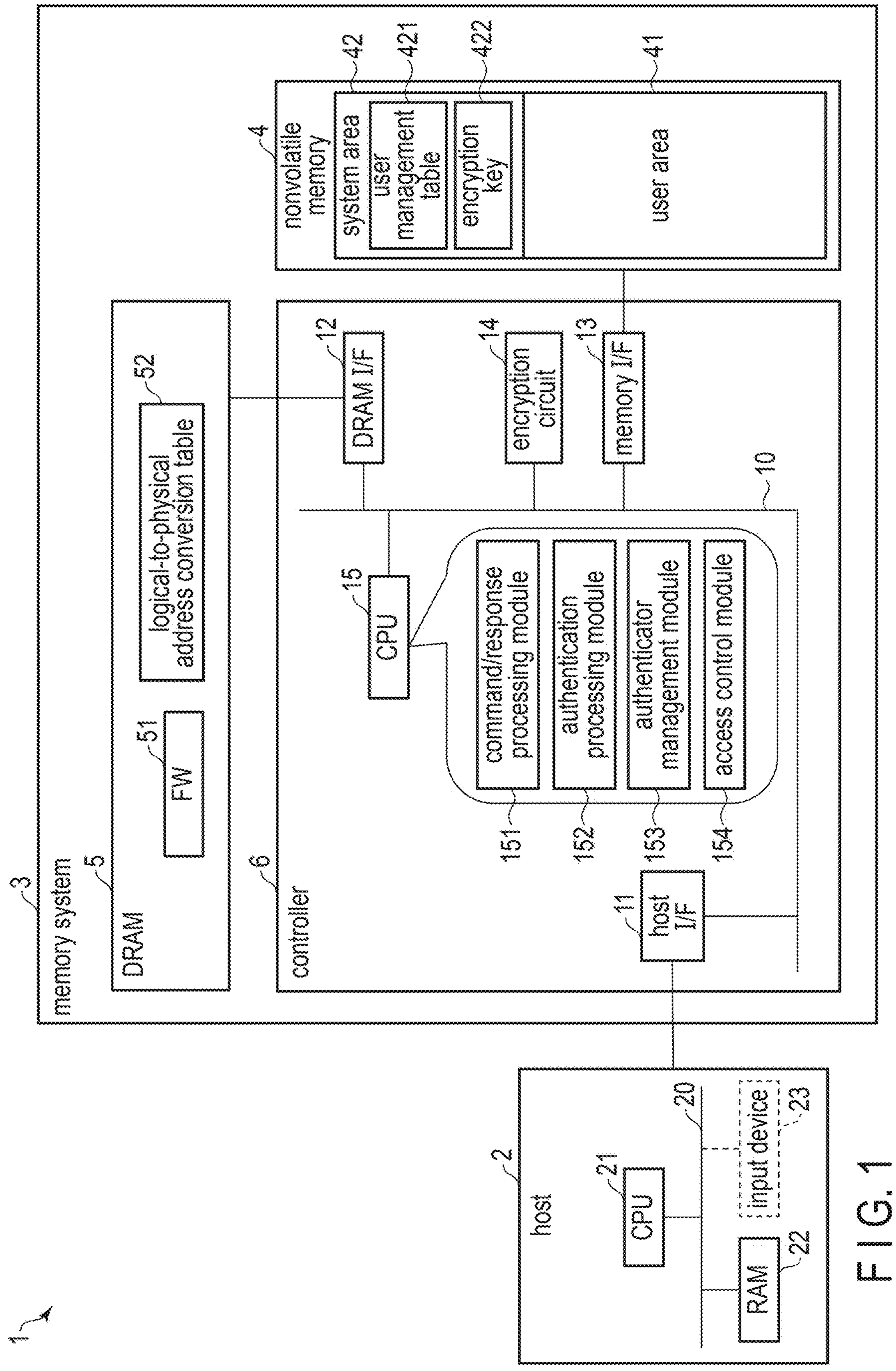
FIG. 1 is a block diagram illustrating an example of a configuration of an information processing system that includes a memory system according to a first embodiment.

In general, according to one embodiment, a memory system includes a nonvolatile memory and a controller. The controller is electrically connected to the nonvolatile memory. The controller communicates with a host. The controller manages first authentication information associated with first user identification information. The controller generates a first authenticator associated with the first user identification information. The controller transmits the first authenticator to the host. The controller receives a first access command that includes the first user identification information and a second authenticator. The controller verifies authenticity of the second authenticator by using at least the first authentication information and the first authenticator. When the authenticity of the second authenticator has been confirmed, the controller executes a first process for the nonvolatile memory in accordance with the first access command. When the authenticity of the second authenticator has not been confirmed, the controller does not execute the first process in accordance with the first access command.

Various embodiments will be described hereinafter with reference to the accompanying drawings.

First Embodiment

First, with reference to FIG. 1, an example of a configuration of an information processing system that includes a memory system according to a first embodiment will be described. The information processing system 1 includes, for example, a host device 2 and a memory system 3. The information processing system 1 may include one or more host devices 2. In that case, each of the one or more host devices 2 is connected to the memory system 3 via a switching device. The switching device is also referred to as an expander or a switch.

The host device 2 may be a storage server that stores a large amount of various data to the memory system 3, or a personal computer. Hereinafter, the host device 2 is also referred to as a host 2.

The memory system 3 is a storage device configured to write data into a nonvolatile memory 4 and read data from the nonvolatile memory 4. The memory system 3 is also referred to as a storage device. The nonvolatile memory 4 is, for example, a NAND flash memory. The memory system 3 is implemented as an SSD including a NAND flash memory, for example. Alternatively, the nonvolatile memory 4 is, for example, a magnetic disk. That is, the memory system 3 may be implemented as a hard disk drive (HDD) including a magnetic disk. Hereinafter, a case where the nonvolatile memory 4 is a NAND flash memory and the memory system 3 is implemented as an SSD will be mainly described as an example.

In order to prevent data leakage and the like, the memory system 3 has, for example, a self-encrypting function of automatically encrypting data at the time of writing. That is, the memory system 3 is a self-encrypting drive (SED) having the self-encrypting function. The memory system 3 conforms to, for example, the TCG standard, and has the self-encrypting function specified in the TCG standard. The TCG standard specifies, for example, data encryption and access control for each partial range in storage.

The memory system 3 may be used as a storage of the host 2. The memory system 3 may be provided inside the host 2 or may be connected to the host 2 via a cable or a network.

An interface for connecting the host 2 to the memory system 3 conforms to standards such as PCI Express™ (PCIe™), Ethernet™, Fibre channel, or NVMe Express™ (NVMe™).

The host 2 includes, for example, a central processing unit (CPU) 21 and a random access memory (RAM) 22. The CPU 21 and the RAM 22 are connected via, for example, a bus 20.

The CPU 21 is, for example, at least one processor. The CPU 21 controls operations of various components of the host 2.

The RAM 22 is, for example, a volatile memory. The RAM 22 is, for example, a dynamic random access memory (DRAM) or a static random access memory (SRAM). A memory in the host 2, such as the RAM 22, is also referred to as a host memory 22.

The host 2 may include an input device 23 for inputting data in accordance with an operation by a user. The input device 23 is, for example, at least one of a keyboard and a pointing device such as a mouse or a touch-screen display.

The memory system 3 includes, for example, the nonvolatile memory 4, a DRAM 5, and a controller 6.

The nonvolatile memory 4 includes a plurality of blocks. The plurality of blocks each function as a minimum unit of a data erase operation. The block is also referred to as an erase block or a physical block. Each of the plurality of blocks includes a plurality of pages. Each of the plurality of pages includes a plurality of memory cells connected to a single word line. The plurality of pages each function as a unit of a data write operation and a data read operation. Note that a word line may also function as a unit of a data write operation and a data read operation.

The tolerable maximum number of program/erase cycles (maximum number of P/E cycles) for each of the plurality of blocks is limited. One P/E cycle of a block includes a data erase operation to erase data stored in all memory cells of the block and a data program operation to write data in each page of the block.

A storage area of the nonvolatile memory 4 includes, for example, a user area 41 and a system area 42.

The user area 41 is an area in which user data is stored. The user data is data stored in the nonvolatile memory 4 in accordance with a request by the host 2. The user area 41 corresponds to, for example, a logical address space provided to one or more users (more specifically, provided to one or more hosts 2). A logical address is an address used by the host 2 for addressing a storage area of the memory system 3. The logical address is, for example, a logical block address (LBA). The logical address space corresponding to the user area 41 is divided into, for example, a plurality of logical address ranges (i.e., a plurality of partial ranges). Each of the plurality of logical address ranges may be allocated to a single user, for example. That is, for each of the plurality of logical address ranges, a user capable of accessing thereto (i.e., a user who may be permitted to access) may be set. The user capable of accessing is a user who may be permitted to access a corresponding logical address range. The access is, for example, at least one of reading data and writing data.

The system area 42 is an area in which data for managing and controlling the memory system 3 is stored. The data for managing and controlling the memory system 3 includes, for example, a user management table 421 and an encryption key 422. The user management table 421 is data used for managing and controlling access to the user area 41 by a user. The encryption key 422 is used for encrypting data to be written into the user area 41 and for decrypting encrypted data read from the user area 41. The system area 42 stores, for example, the encryption key 422 corresponding to each user. Alternatively, the system area 42 may store the encryption key 422 corresponding to each of the plurality of logical address ranges (partial ranges) that correspond to the user area 41.

Here, a configuration of the user management table 421 will be described.

FIG. 2 illustrates an example of the configuration of the user management table 421. The user management table 421 includes, for example, a plurality of entries that correspond to a plurality of users, respectively. Each of the plurality of entries includes, for example, fields of a user ID, authentication information, range information, converted authentication information, and a user authenticator. Values of the fields included in an entry are associated each other.

The user ID field indicates identification information (user ID) of a corresponding user. The user ID is information by which the corresponding user is uniquely identifiable. The user ID is set in the user ID field when the corresponding user starts using the memory system 3, for example.

The authentication information field indicates authentication information associated with the corresponding user. The authentication information associated with the user is, for example, a personal identification number (PIN) or a password. The authentication information field is set when the corresponding user starts using the memory system 3, for example. More specifically, the user ID and the authentication information are set, for example, through a password setting sequence performed when the user starts using the memory system 3.

The range information field indicates a range allocated to the corresponding user. The range is, for example, a partial range (i.e., a logical address range) within the logical address space. Specifically, the range information field indicates, for example, a start address of the logical address range, which is allocated to the corresponding user, and the size (length) of the logical address range. Alternatively, the range information field may indicate information by which a namespace allocated to the corresponding user is uniquely identifiable (i.e., a namespace ID). Information about a range is set in the range information field when the corresponding user starts using the memory system 3, for example.

The converted authentication information field indicates information obtained by performing a first calculation process on the authentication information associated with the corresponding user (i.e., the authentication information indicated in the authentication information field). The information obtained by performing the first calculation process on the authentication information is also referred to as converted authentication information. A calculation algorithm used for the first calculation process may be any calculation algorithm that is shared in advance between the host 2 and the memory system 3. The calculation algorithm used for the first calculation process is, for example, specified in a standard to which the host 2 and the memory system 3 conform (e.g., the TCG standard). Specifically, the first calculation process is, for example, a calculation process in which a specific hash function is used. In that case, in the converted authentication information field, a hash value of the authentication information, which is associated with the corresponding user, is set as the converted authentication information.

The user authenticator field indicates a user authenticator generated for the corresponding user. The user authenticator is data required to access the range allocated to the user (i.e., the range indicated in the range information field). The user authenticator includes, for example, a random number. For example, in response to successful authentication of the user, the user authenticator is generated and set in the user authenticator field. Alternatively, in response to the successful authentication of the user and permission to access the range allocated to the user, the user authenticator may be generated and set in the user authenticator field. In addition, for example, in response to the permission to access the range allocated to the user being nullified (i.e., access to the range allocated to the user being prohibited), the user authenticator is deleted from the user authenticator field.

In the example illustrated in FIG. 2, a user ID “user1” corresponding to a user is associated with authentication information “pin1”, range information “range1”, converted authentication information “c_pin1”, and a user authenticator “aid1”. In addition, a user ID “user2” corresponding to another user is associated with authentication information “pin2”, range information “range2”, converted authentication information “c_pin2”, and a user authenticator “aid2”.

With the configuration described above, the controller 6 can use the user management table 421 to control access to the nonvolatile memory 4 (more specifically, the user area 41) by a user.

Note that each entry in the user management table 421 may further include an expiration date field. The expiration date field indicates an expiration date of the user authenticator generated for the corresponding user. The expiration date may be represented by, for example, a date and time, time that has elapsed since the user authenticator was generated, or an event. The event that causes the expiration date to expire is, for example, a nullity of access permission to the range allocated to the user. In the example illustrated in FIG. 2, an expiration date “exp1” is associated with the user authenticator “aid1”, which is associated with the user ID “user1”. In addition, an expiration date “exp2” is associated with the user authenticator “aid2”, which is associated with the user ID “user2”.

Note that the configuration of the user management table 421 illustrated in FIG. 2 is an example. In the memory system 3, any configuration of data may be used to manage and control access to the user area 41 by a user.

The description returns to FIG. 1.

The DRAM 5 is a volatile memory. A storage area of the DRAM 5 is allocated to, for example, a storage area of firmware (FW) 51 and a cache area of a logical-to-physical address conversion table 52. The storage area of the DRAM 5 may be further allocated to a buffer area in which user data is temporarily stored.

The FW 51 is a program for controlling an operation of the controller 6. The FW 51 is loaded from the nonvolatile memory 4 to the DRAM 5, for example.

The logical-to-physical address conversion table 52 is a table for managing mapping between each logical address and each physical address.

The controller 6 may be implemented with a circuit such as a system-on-a-chip (SoC). The controller 6 may be configured with a plurality of semiconductor chips. The controller 6 is electrically connected to the nonvolatile memory 4 and is configured to control the nonvolatile memory 4. The function of each unit of the controller 6 may be realized by dedicated hardware in the controller 6 or may be realized by a processor executing the FW 51.

The controller 6 may function as a flash translation layer (FTL) configured to execute data management and block management of the nonvolatile memory 4. The data management executed by the FTL includes (1) management of mapping data indicative of a relationship between each logical address and each physical address of the nonvolatile memory 4, and (2) process to hide a difference between data read/write operations in units of page and data erase operations in units of block. The block management includes management of defective blocks, wear-leveling, and garbage collection.

The management of mapping between each logical address and each physical address is executed by using, for example, the logical-to-physical address conversion table 52. The controller 6 uses the logical-to-physical address conversion table 52 to manage the mapping between each logical address and each physical address in a certain management size. A physical address corresponding to a logical address indicates a physical memory location in the nonvolatile memory 4 to which data of the logical address has been written. The controller 6 manages, by using the logical-to-physical address conversion table 52, a plurality of storage areas that are obtained by logically dividing the storage area of the nonvolatile memory 4. The size of each of the plurality of storage areas is the management size described above. The plurality of storage areas correspond to a plurality of logical addresses, respectively. In other words, each of the plurality of storage areas is identified by one logical address. The logical-to-physical address conversion table 52 may be loaded from the nonvolatile memory 4 to the DRAM 5 when the memory system 3 is boot up.

The data write operation into one page is executable only once in a single P/E cycle. Thus, the controller 6 writes updated data corresponding to a logical address not to an original physical memory location in which previous data corresponding to the logical address is stored but to a different physical memory location. Then, the controller 6 updates the logical-to-physical address conversion table 52 to associate the logical address with this different physical memory location rather than the original physical memory location and to invalidate the previous data (i.e., data stored in the original physical memory location). Data to which the logical-to-physical address conversion table 52 refers (that is, data associated with a logical address) is referred to as valid data. Furthermore, data not associated with any logical address is referred to as invalid data. The valid data is data that may be requested for reading by the host 2 later. The invalid data is data that is no longer to be requested for reading by the host 2. Hereinafter, a case where the logical address is an LBA will be mainly explained as an example.

The controller 6 includes, for example, a host interface circuit (host I/F) 11, a DRAM interface circuit (DRAM I/F) 12, a memory interface circuit (memory I/F) 13, an encryption circuit 14, and a CPU 15. The host I/F 11, the DRAM I/F 12, the memory I/F 13, the encryption circuit 14, and the CPU 15 are connected, for example, via a bus 10.

The host I/F 11 is configured to communicate with the host 2. The host I/F 11 is, for example, a circuit configured to receive various commands (e.g., an input/output (I/O) command and a control command) and data from the host 2 and to transmit a response to a command and data to the host 2. The I/O command is, for example, an access command such as a write command or a read command. The control command is, for example, an authentication request command or an authenticator acquisition command. The authentication request command is a command that requests authentication of a user who is using the host 2. The authenticator acquisition command is a command that requests acquisition of a user authenticator. The authentication request command and the authenticator acquisition command are realized as, for example, TCG commands.

The DRAM I/F 12 functions as a DRAM control circuit configured to control access to the DRAM 5.

The memory I/F 13 functions as a memory control circuit configured to control the nonvolatile memory 4. The memory I/F 13 may be connected to a plurality of memory chips in the nonvolatile memory 4 via a plurality of channels. By operating the plurality of memory chips in parallel, it is possible to broaden an access bandwidth between the controller 6 and the nonvolatile memory 4.

The encryption circuit 14 performs encryption and decryption of data. For example, the encryption circuit 14 encrypts data to be written into the nonvolatile memory 4 (more specifically, into the user area 41) via the memory I/F 13, and decrypts encrypted data read from the nonvolatile memory 4 via the memory I/F 13. The encryption circuit 14 uses, for example, the encryption key 422 set by the CPU 15 to perform the encryption and decryption of data.

The CPU 15 is a processor configured to control the host I/F 11, the DRAM I/F 12, the memory I/F 13, and the encryption circuit 14. The CPU 15 performs various processes by executing the FW 51 loaded from the nonvolatile memory 4 to the DRAM 5. The FW 51 is a control program that includes instructions for causing the CPU 15 to execute the various processes. The CPU 15 may perform command processes to process various commands from the host 2. The operation of the CPU 15 is controlled by the FW 51 executed by the CPU 15.

The CPU 15 functions as, for example, a command/response processing module 151, an authentication processing module 152, an authenticator management module 153, and an access control module 154. The CPU 15 functions as each of these modules, for example, by executing the FW 51.

The command/response processing module 151 receives, via the host I/F 11, a command issued by the host 2. The command issued by the host 2 is, for example, an authentication request command, an authenticator acquisition command, or an access command. The command/response processing module 151 causes at least one of the authentication processing module 152, the authenticator management module 153, and the access control module 154 to execute a process in accordance with the received command. The command/response processing module 151 transmits a response based on the execution result of the process in accordance with the command, to the host 2 via the host I/F 11.

The authentication processing module 152 manages information related to authentication of a user and performs authentication of a user. Specifically, the authentication processing module 152 uses, for example, the user management table 421 to manage the information related to authentication of a user. The information related to authentication of a user includes, for example, a user ID, authentication information, and range information that correspond to the user.

The authentication processing module 152 performs authentication of a user when the command/response processing module 151 has received an authentication request command from the host 2. Specifically, the authentication processing module 152 acquires a user ID and authentication information (hereinafter, also referred to as target authentication information) from the authentication request command. The authentication processing module 152 acquires authentication information associated with the acquired user ID (hereinafter, also referred to as registered authentication information) from the user management table 421. The authentication processing module 152 determines whether or not the authentication of the user is successful depending on whether or not the target authentication information matches the registered authentication information. That is, in a case where the target authentication information matches the registered authentication information, the authentication processing module 152 determines that the authentication of the user is successful. In a case where the target authentication information does not match the registered authentication information, the authentication processing module 152 determines that the authentication of the user is unsuccessful. The success or failure of the authentication of the user is transmitted to the host 2 by the command/response processing module 151 as a response to the authentication request command.

The authenticator management module 153 generates a user authenticator and manages the generated user authenticator. The authenticator management module 153 uses, for example, the user management table 421 to manage the user authenticator.

In a case where authentication of a user is successful, the authenticator management module 153 generates a user authenticator associated with the user. Alternatively, in a case where the authentication of the user is successful and access to a range allocated to the user (i.e., an LBA range associated with the user ID) has been permitted, the authenticator management module 153 may generate the user authenticator. The authenticator management module 153 stores, in the user management table 421, the generated user authenticator associated with the user ID, which is included in the authentication request command. Note that, in a case where the authentication of the user is unsuccessful, the authenticator management module 153 does not generate any user authenticator.

When the command/response processing module 151 has received an authenticator acquisition command from the host 2, the authenticator management module 153 transmits a user authenticator to the host 2.

Specifically, the authentication processing module 152 acquires a user ID from the authenticator acquisition command. The authenticator management module 153 acquires a user authenticator associated with the acquired user ID (hereinafter, also referred to as a registered user authenticator) from the user management table 421. The registered user authenticator is transmitted to the host 2 by the command/response processing module 151 as a response to the authenticator acquisition command.

For example, when permission to access a range allocated to a user is nullified, the authenticator management module 153 discards a user authenticator associated with the user. Specifically, for example, the authenticator management module 153 deletes the user authenticator from the user management table 421.

The host 2 which is about to transmit an access command performs the first calculation process on authentication information of a user who is to access the memory system 3 with the access command, thereby generating converted authentication information corresponding to the user. The host 2 further performs a second calculation process on the generated converted authentication information, a start address of an LBA range to be accessed, and a user authenticator received as a response to an authenticator acquisition command, thereby generating an access authenticator. As a calculation algorithm used for the second calculation process, any calculation algorithm shared in advance between the host 2 and the memory system 3 may be used. The calculation algorithm used for the second calculation process is, for example, specified in the standard to which the host 2 and the memory system 3 conform. Specifically, the second calculation process is, for example, a process of an exclusive-logical-OR (XOR) operation. Alternatively, the second calculation process may be a calculation process in which a certain hash function is used. Note that the host 2 may generate the access authenticator by performing the second calculation process on the authentication information (instead of the converted authentication information), the start address, and the user authenticator.

The access control module 154 controls access to the nonvolatile memory 4 when the command/response processing module 151 has received an access command from the host 2. The access command includes, for example, a user ID, range information, and an access authenticator. The range information included in the access command indicates an LBA range to be accessed by the host 2 (hereinafter, also referred to as a target LBA range). In other words, the range information included in the access command indicates an LBA range to be accessed in accordance with the access command. To be more specific, the range information indicates, for example, a start address of the target LBA range and the size of the target LBA range. The user ID included in the access command is also referred to as a target user ID. The access authenticator included in the access command is also referred to as a target access authenticator.

Specifically, the access control module 154 verifies the authenticity of the target access authenticator by using at least the registered authentication information and the registered user authenticator that are associated with the target user ID. In a case where the authenticity of the target access authenticator has been confirmed, the access control module 154 executes a process for the nonvolatile memory 4 in accordance with the access command. In a case where the authenticity of the target access authenticator has not been confirmed, the access control module 154 does not execute the process for the nonvolatile memory 4 in accordance with the access command.

The verification of the authenticity of the target access authenticator will be described in detail.

First, when an access command has been received from the host 2, the access control module 154 acquires the target user ID, the range information, and the target access authenticator from the access command. The access control module 154 acquires the registered authentication information and the registered user authenticator that are associated with the target user ID, from the user management table 421.

The access control module 154 verifies the authenticity of the target access authenticator by using the registered authentication information and the registered user authenticator that have been acquired, and the range information in the access command.

Specifically, the access control module 154 performs, for example, the first calculation process on the registered authentication information, thereby generating the converted authentication information. Note that, the access control module 154 may acquire the converted authentication information associated with the target user ID from the user management table 421 instead of generating the converted authentication information. In other words, the converted authentication information may be generated and stored in the user management table 421 in advance.

Next, the access control module 154 performs the second calculation process on the converted authentication information, the start address of the LBA range indicated by the range information, and the registered user authenticator, thereby generating a verification authenticator. Note that the access control module 154 may generate the verification authenticator by performing the second calculation on the registered authentication information (instead of the converted authentication information), the start address, and the registered user authenticator.

The access control module 154 determines whether or not the authenticity of the target access authenticator has been confirmed depending on whether or not the generated verification authenticator matches the target access authenticator. That is, in a case where the generated verification authenticator matches the target access authenticator, the access control module 154 determines that the authenticity of the target access authenticator has been confirmed. In a case where the generated verification authenticator does not match the target access authenticator, the access control module 154 determines that the authenticity of the target access authenticator has not been confirmed.

With the configuration described above, the command/response processing module 151, the authentication processing module 152, the authenticator management module 153, and the access control module 154 can permit access to the nonvolatile memory 4 by a user with authentic authority, but prohibit access to the nonvolatile memory 4 by a user without authentic authority. The user with authentic authority is a user who has authentic authentication information and is permitted to access the range to be accessed (target LBA range). Specific operations of the command/response processing module 151, the authentication processing module 152, the authenticator management module 153, and the access control module 154 will be described later with reference to FIG. 7 to FIG. 10.

Here, LBA ranges that are provided to one or more hosts 2 by the memory system 3 will be explained. As mentioned above, the user area 41 in the nonvolatile memory 4 corresponds to the LBA ranges that are provided to one or more users (more specifically, to the one or more hosts 2). To each of the one or more users, a partial range (LBA range) obtained by dividing the LBA space may be allocated.

Figure 3:
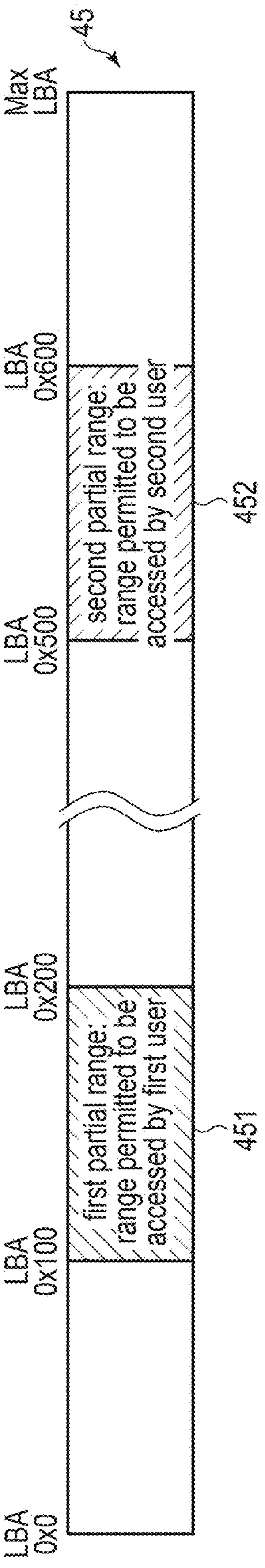
FIG. 3 is a diagram illustrating an example of a logical address space managed in the memory system according to the first embodiment.

FIG. 3 illustrates an example of the LBA space managed in the memory system 3. The LBA space 45 includes a plurality of LBAs. In the example illustrated in FIG. 3, the LBA space 45 includes a plurality of LBAs from an LBA "0x0" to a MaxLBA. The MaxLBA is the last LBA of the LBA space and is capable of being set freely.

The LBA space 45 is, for example, divided into a plurality of partial ranges. In other words, the LBA space 45 is divided into a plurality of LBA ranges. Each of the plurality of partial ranges may have the same size or may have different sizes. Each of the plurality of partial ranges is, for example, allocated to one user. The user to whom a partial range is allocated may be permitted to access the partial range.

In the example illustrated in FIG. 3, the LBA space 45 includes a first partial range 451 and a second partial range 452.

The first partial range 451 is an LBA range from an LBA "0x100" to an LBA "0x200". The first partial range 451 is allocated to a first user. In other words, the first partial range 451 may be permitted to be accessed only by the first user. Specifically, for example, in a case where authentication of the first user based on the authentication information is successful, access to the first partial range 451 by the first user is permitted.

The second partial range 452 is an LBA range from an LBA "0x500" to an LBA "0x600". The second partial range 452 is allocated to a second user who is different from the first user. In other words, the second partial range 452 may be permitted to be accessed only by the second user. Specifically, for example, in a case where authentication of the second user based on the authentication information is successful, access to the second partial range 452 by the second user is permitted.

In this manner, in the LBA space 45, access by a user is controlled for each partial range. Such access control for each partial range is specified by, for example, the TCG standard.

Figure 4:
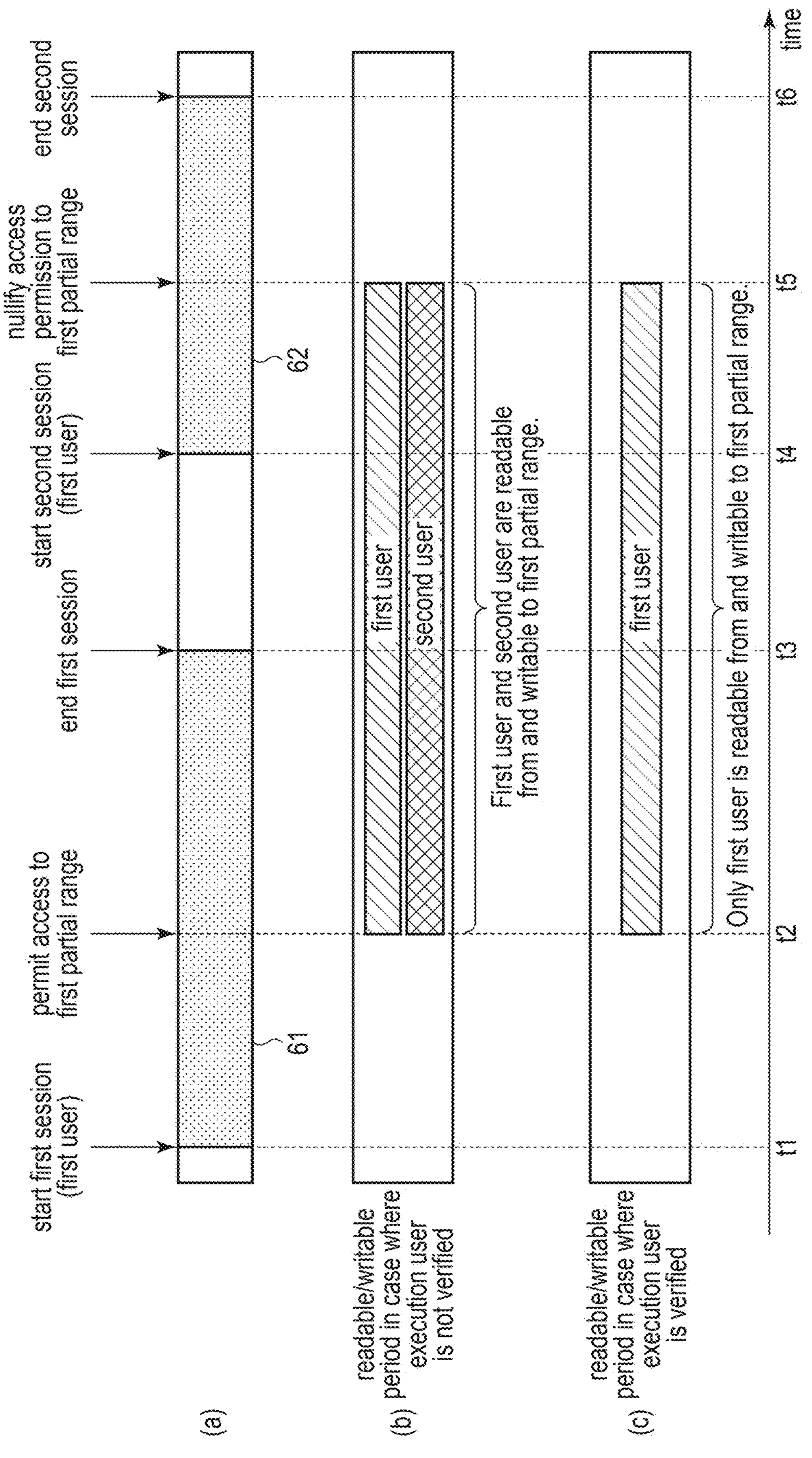
FIG. 4 is a diagram illustrating (a) a transition of sessions in a case where a user accesses a partial range in the logical address space, (b) a first example of users and a period permitted to access the partial range, and (c) a second example of a user and a period permitted to access the partial range, in the memory system according to the first embodiment.

FIG. 4 illustrates (a) a transition of sessions in a case where a user accesses a partial range in the logical address space 45, (b) a first example of users and a period permitted to access the partial range, and (c) a second example of a user and a period permitted to access the partial range, in the memory system 3. Here, sessions in a case where the first user accesses the first partial range 451 will be explained as an example.

As illustrated in FIG. 4 (*a*), in a case where a first session 61 for permitting access by the first user is started at time t1, authentication of the first user is performed in the memory system 3. In a case where the authentication of the first user is successful, access to the first partial range 451 allocated to the first user is permitted at time t2. In other words, the first partial range 451 is unlocked. Then, at time t3, the first session 61 is ended.

Thereafter, in a case where a second session 62 for nullifying the permission of access by the first user is started at time t4, the authentication of the first user is performed in the memory system 3. In a case where the authentication of the first user is successful, the permission to access the first partial range 451 allocated to the first user is nullified at time t5. In other words, the first partial range 451 is locked. Then, at time t6, the second session 62 is ended.

For example, in the TCG Opal standard, in a case where the authentication of the first user is successful, not only a host being used by the first user, but also a host being used by an unauthenticated user (e.g., the second user) may be able to access the first partial range 451. This is because, in a case where the authentication of the first user is successful and access to the first partial range 451 is permitted, any user's access command is executable for the first partial range 451. Specifically, because it is not verified whether a user who has issued an access command is the first user or not, any access command issued by any user is executable for the first partial range 451. An unauthenticated user may be a user who does not have authentic authority. Therefore, access to the first partial range 451 by the host 2 being used by the unauthenticated user may result in security defects such as leakage or tampering of data stored in the first partial range 451.

As illustrated in FIG. 4 (*b*), in a case where the user who has issued the access command is not verified on whether or not the user is the first user whose authentication was successful, not only the first user but also, for example, the second user is able to access (i.e., read/write access) the first partial range 451 from the time t2 when access to the first partial range 451 is permitted to the time t5 when access to the first partial range 451 is nullified. That is, even though the authentication of the second user based on the authentication information has not been performed and access to the first partial range 451 by the second user is not permitted, the second user is able to access the first partial range 451.

In contrast, the memory system 3 of the present embodiment is configured so that only the host 2 being used by a user whose authentication is successful is able to access a partial range allocated to the user, but a host 2 being used by another unauthenticated user is unable to access the partial range. The memory system 3 controls access to the partial range by verifying whether or not a user who has issued an access command is the first user whose authentication is successful. As a result, as illustrated in FIG. 4 (*c*), the memory system 3 can perform control so that only the first user is able to access the first partial range 451 from the time t2 when access to the first partial range 451 is permitted to the time t5 when access to the first partial range 451 is nullified.

Specifically, in a case where authentication of a user is successful, the controller 6 of the memory system 3 transmits a user authenticator to the host 2 being used by the user.

The controller 6 receives, from the host 2, an access command that includes identification information of a user and an access authenticator. The controller 6 verifies the authenticity of the access authenticator in the access command by using at least the user authenticator and authentication information of the user that are stored in the memory system 3. In a case where the authenticity of the access authenticator has been confirmed, the controller 6 executes a process for the nonvolatile memory 4 (e.g., for the first partial range 451) in accordance with the access command. On the other hand, in a case where the authenticity of the access authenticator has not been confirmed, the controller 6 does not execute the process for the nonvolatile memory 4 in accordance with the access command.

In this manner, the memory system 3 can perform control so that only the host 2 being used by the user who has been successfully authenticated is able to access the partial range allocated to the user. Therefore, the memory system 3 can enhance the security of access to the nonvolatile memory 4.

Figure 5:
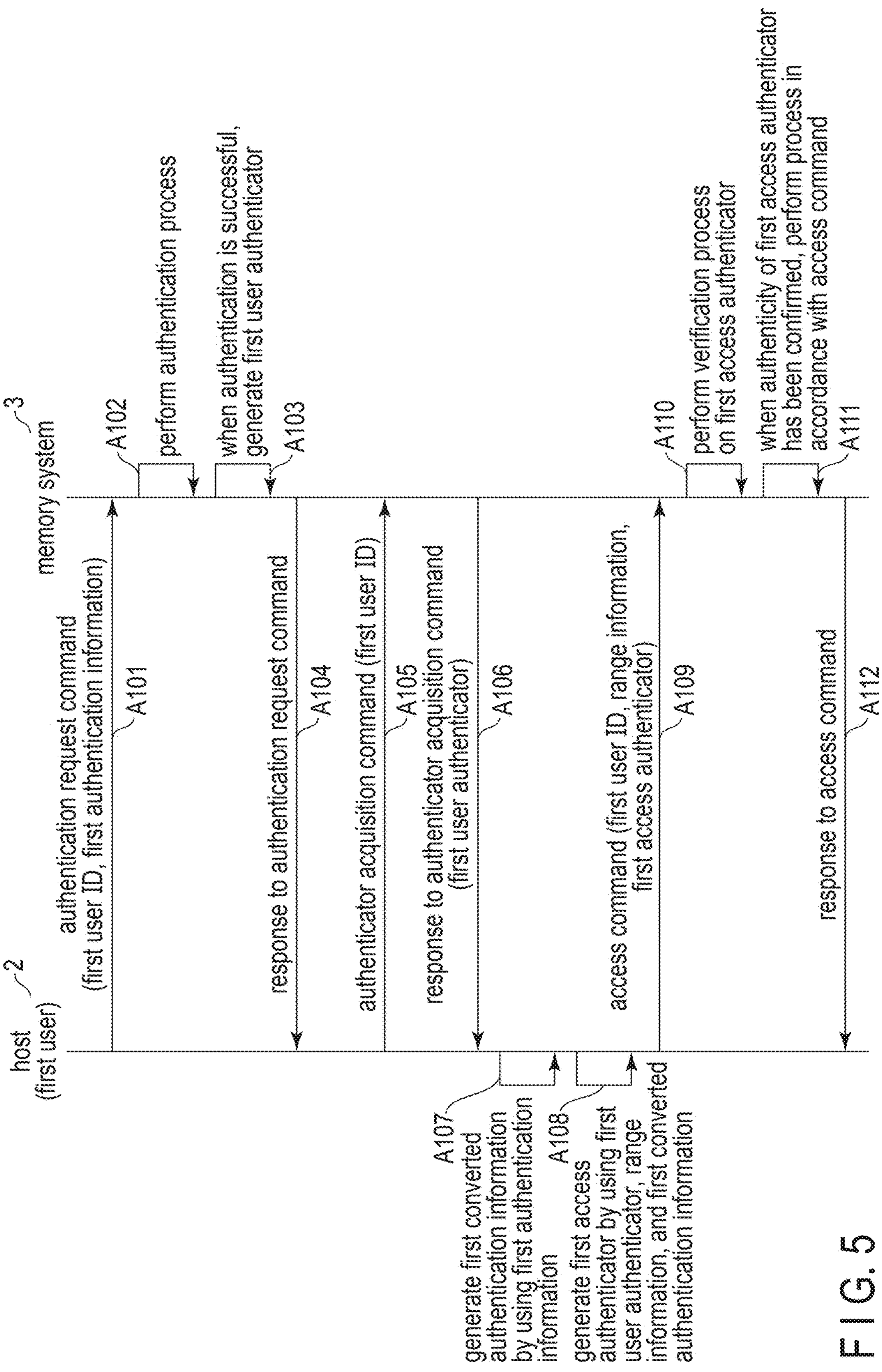
FIG. 5 is a sequence diagram illustrating an example of an authentication and access operation in a host and the memory system according to the first embodiment.

FIG. 5 is a sequence diagram illustrating an example of an authentication and access operation in the host 2 and the memory system 3. The authentication and access operation is an operation for permitting a user with authentic authority to access a range (LBA range) allocated to the user, but prohibiting access to this range by another user. Here, a case where the user using the host 2 is the first user with authentic authority will be explained as an example. A user ID of the first user is referred to as a first user ID. Authentication information of the first user is referred to as first authentication information.

First, the host 2 transmits, to the memory system 3, an authentication request command to authenticate the first user (A101). The authentication request command includes, for example, the first user ID and the first authentication information. The first user ID and the first authentication information are input to the host 2, for example, in response to operations on the input device 23 by the first user.

The memory system 3 performs an authentication process in accordance with the authentication request command received from the host 2 (A102). Specifically, the memory system 3 acquires the first user ID and the first authentication information from the authentication request command. The memory system 3 acquires registered authentication information associated with the acquired first user ID (hereinafter, also referred to as first registered authentication information) from the user management table 421. The memory system 3 determines whether or not the authentication is successful depending on whether or not the first authentication information matches the first registered authentication information. Here, it is assumed that the first authentication information matches the first registered authentication information and thus the authentication is successful.

When the authentication is successful, the memory system 3 generates a user authenticator associated with the first user ID (A103). Hereinafter, this user authenticator is also referred to as a first user authenticator. In the user management table 421, the memory system 3 sets the first user authenticator in the user authenticator field of an entry that includes the first user ID. As a result, the first user authenticator is associated with the first user ID. The memory system 3 then transmits a response to the authentication request command to the host 2 (A104). This response indicates that the authentication in accordance with the authentication request command is successful, but does not include the first user authenticator.

After receiving the response indicating that the authentication is successful, the host 2 transmits an authenticator acquisition command to the memory system 3 (A105). The authenticator acquisition command includes, for example, the first user ID.

In response to the authenticator acquisition command received from the host 2, the memory system 3 transmits a response that includes the first user authenticator associated with the first user ID to the host 2 as a response to the authenticator acquisition command (A106). Specifically, the memory system 3 acquires the first user ID from the authenticator acquisition command. The memory system 3 acquires the first user authenticator associated with the acquired first user ID from the user management table 421. The memory system 3 then transmits the response including the acquired first user authenticator to the host 2.

After receiving the response including the first user authenticator, the host 2 performs the first calculation process on the first authentication information, thereby generating converted authentication information (A107). Hereinafter, this converted authentication information is also referred to as first converted authentication information. The first converted authentication information is, for example, a hash value of the first authentication information. The host 2 performs the second calculation process using the first user authenticator, range information, and the first converted authentication information, thereby generating an access authenticator (A108). Hereinafter, this access authenticator is also referred to as a first access authenticator. The first access authenticator is, for example, an exclusive-logical-OR of the first user authenticator, a start address of a target LBA range indicated by the range information, and the first converted authentication information. Alternatively, the first access authenticator may be a hash value of data in which the first user authenticator, the start address of the target LBA range, and the first converted authentication information are concatenated.

Next, the host 2 transmits, to the memory system 3, an access command to access the nonvolatile memory 4 (A109). The access command is, for example, either a read command to read user data from the nonvolatile memory 4 or a write command to write user data into the nonvolatile memory 4. The access command includes, for example, the first user ID, the range information, and the first access authenticator.

In response to the access command received from the host 2, the memory system 3 performs a verification process on the first access authenticator included in the access command (A110). The verification process is a process of verifying the authenticity of the first access authenticator.

Specifically, the memory system 3 acquires the first user ID, the range information, and the first access authenticator from the access command. The memory system 3 acquires, from the user management table 421, the first user authenticator associated with the acquired first user ID and the converted authentication information associated with the acquired first user ID (hereinafter, also referred to as first registered converted authentication information). Note that the memory system 3 may acquire, based on the range information acquired from the access command, the first user authenticator and the first registered converted authentication information that are associated with range information indicative of an LBA range (region) that includes the target LBA range, from the user management table 421. The memory system 3 performs the second calculation process using the first user authenticator and the first registered converted authentication information acquired from the user management table 421 and the range information acquired from the access command, thereby generating a verification authenticator (hereinafter, also referred to as a first verification authenticator). For example, the first verification authenticator is an exclusive-logical-OR of the first user authenticator, the first registered converted authentication information, and the start address of the target LBA range. Alternatively, the first verification authenticator may be a hash value of data in which the first user authenticator, the first registered converted authentication information, and the start address of the target LBA range are concatenated.

The memory system 3 then determines whether or not the authenticity of the first access authenticator has been confirmed depending on whether or not the first access authenticator matches the first verification authenticator. Here, it is assumed that the first access authenticator matches the first verification authenticator and thus the authenticity of the first access authenticator has been confirmed. Note that the memory system 3 may further determine whether or not the target LBA range is included in an LBA range that is permitted to be accessed by the first user.

When the authenticity of the first access authenticator has been confirmed, the memory system 3 performs a process in accordance with the access command (A111). The memory system 3 then transmits a response to the access command to the host 2 (A112).

Specifically, for example, in a case where the access command is a read command, the memory system 3 reads user data from the nonvolatile memory 4 on the basis of the range information (target LBA range) and the logical-to-physical address conversion table 52. Note that, in a case where the read user data is encrypted data, the memory system 3 decrypts the encrypted data with the encryption key 422 associated with the first user ID (or the first user authenticator), thereby generating user data. The memory system 3 then transmits, to the host 2, the user data and a response indicating that the process in accordance with the read command has been completed.

For example, in a case where the access command is a write command, the memory system 3 writes user data into the nonvolatile memory 4 and updates the logical-to-physical address conversion table 52 on the basis of the range information. Note that the memory system 3 may encrypt the user data to be written into the nonvolatile memory 4 with the encryption key 422 associated with the first user ID (or the first user authenticator), thereby generating encrypted data. In this case, the memory system 3 writes the encrypted data into the nonvolatile memory 4 and updates the logical-to-physical address conversion table 52 on the basis of the range information. The memory system 3 then transmits, to the host 2, a response indicating that the process in accordance with the write command has been completed.

Through the authentication and access operation described above, the memory system 3 can perform control so that only the first user with authentic authority can access only the range (LBA range) permitted for the first user.

Specifically, after the authentication of the first user is successful and the first user authenticator is generated, the memory system 3 transmits the first user authenticator to the host 2 in response to the authenticator acquisition command. The host 2 can acquire the first user authenticator from the memory system 3 at any time with use of the authenticator acquisition command after the first user authenticator is generated until the first user authenticator is discarded (for example, while access to the range allocated to the first user is permitted). Therefore, the host 2 acquires the first user authenticator from the memory system 3 at a timing when it is necessary to access the nonvolatile memory 4, for example. This prevents the first user authenticator from leaking from the host memory 22 since there is no need to store the first user authenticator in the host memory 22 for a long period of time even if the first user authenticator is temporarily stored in the host memory 22.

In addition, as the access authenticator included in an access command, the first access authenticator obtained by performing the second calculation process using the first user authenticator, the range information, and the first converted authentication information is used. As a result, even in a case where the access command is sniffed, since the first access authenticator in the access command is generated using the range information, the memory system 3 can prevent access to a range that is different from the range designated in the range information. In other words, the memory system 3 can prevent a replay attack on any range using the sniffed access command.

Furthermore, another user who does not have authentic authentication information (in this case, the authentication information of the first user) cannot generate the first access authenticator correctly. Therefore, for example, even in a case where a response including the first user authenticator is sniffed, the memory system 3 can prevent access to the nonvolatile memory 4 using the sniffed first user authenticator by said another user.

In this manner, even if one or more of commands and responses transferred between the memory system 3 and the host 2 used by the first user have been sniffed, the memory system 3 can prevent unauthorized access to the nonvolatile memory 4 with information obtained through the sniffing. Therefore, the memory system 3 can enhance the security of access to the nonvolatile memory 4.

Here, an operation in which access to the nonvolatile memory 4 using the sniffed first user authenticator is prevented will be described.

Figure 6:
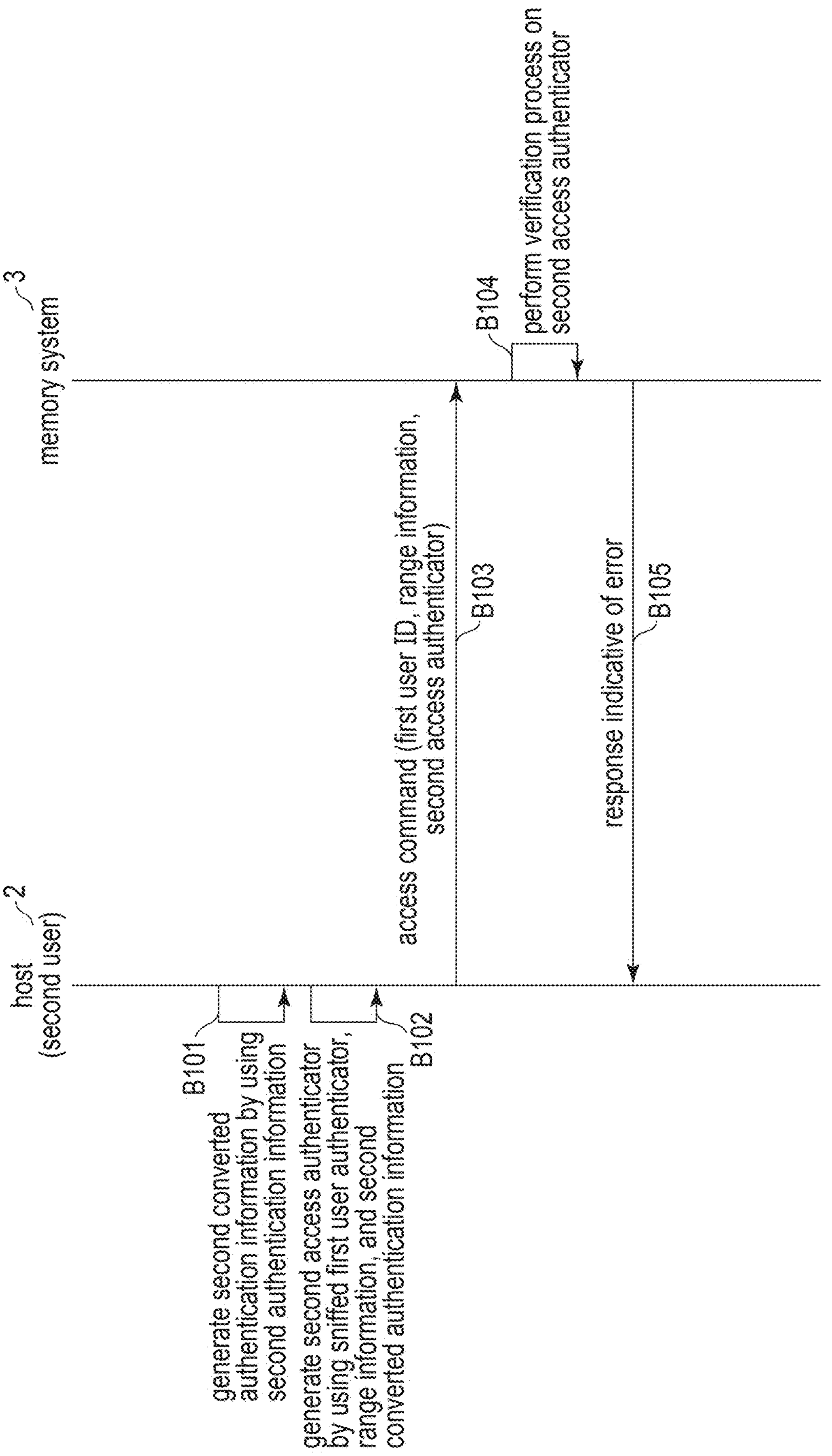
FIG. 6 is a sequence diagram illustrating another example of an access operation in the host and the memory system according to the first embodiment.

FIG. 6 is a sequence diagram illustrating an example of an access operation in the host 2 and the memory system 3. The access operation is an example of an operation in which access to the nonvolatile memory 4 using a sniffed command or response is prevented. Here, a case where a user other than the first user (hereinafter, referred to as a second user) has sniffed the first user authenticator, which is included in the response to the authenticator acquisition command, will be explained. Authentication information of the second user is referred to as second authentication information. Note that a host 2 used by the second user may be the same as the host 2 used by the first user, or may be different.

After sniffing the first user authenticator, the host 2 performs the first calculation process on the second authentication information, thereby generating converted authentication information (B101). Hereinafter, this converted authentication information is also referred to as second converted authentication information. The host 2 performs the second calculation process using the sniffed first user authenticator, range information, and the second converted authentication information, thereby generating an access authenticator (second access authenticator) in step B102. Then, the host 2 transmits, to the memory system 3, an access command to access the nonvolatile memory 4 (B103). The access command includes, for example, the first user ID, the range information indicative of a target LBA range, and the second access authenticator. Note that the first user ID may be acquired, for example, by sniffing any command transmitted from the host 2 used by the first user to the memory system 3.

In response to the access command received from the host 2, the memory system 3 performs a verification process on the second access authenticator included in the access command (B104). The verification process is a process of verifying the authenticity of the second access authenticator.

Specifically, the memory system 3 acquires the first user ID, the range information, and the second access authenticator from the access command. The memory system 3 acquires, from the user management table 421, the first user authenticator and the first registered converted authentication information that are associated with the acquired first user ID. Note that the memory system 3 may acquire, based on the range information acquired from the access command, the first user authenticator and the first registered converted authentication information that are associated with range information indicative of an LBA range that includes the target LBA range, from the user management table 421. The memory system 3 performs the second calculation process using the first user authenticator, the first registered converted authentication information, and the range information, thereby generating a verification authenticator (first verification authenticator).

The memory system 3 then determines whether or not the authenticity of the second access authenticator has been confirmed depending on whether or not the second access authenticator matches the first verification authenticator. The second access authenticator was generated by using the second converted authentication information based on the authentication information of the second user (second authentication information) rather than the first converted authentication information based on the authentication information of the first user. Thus, the second access authenticator does not match the first verification authenticator. Therefore, the memory system 3 determines that the authenticity of the second access authenticator has not been confirmed. Note that the memory system 3 may further determine whether or not the target LBA range is included in the LBA range that is permitted to be accessed by the first user.

Since the authenticity of the second access authenticator has not been confirmed, the memory system 3 transmits a response indicative of an error to the host 2 (B105).

Through the access operation described above, the memory system 3 can prevent access to the nonvolatile memory 4 using the sniffed first user authenticator. In other words, even in a case where the second user who does not have authentic authentication information has sniffed the first user authenticator, the memory system 3 can prevent unauthorized access to the nonvolatile memory 4 by the second user.

As in the operations illustrated in FIG. 5 and FIG. 6, the memory system 3 receives an access command including an access authenticator that is based on a user authenticator, range information, and converted authentication information, from the host 2. By using such an access command, the memory system 3 can permit a user with authentic authority to access a range allocated to the user, but prohibit unauthorized access to this range by another user.

The authentication and access operation will be described in more detail with reference to FIG. 7 to FIG. 10.

Figure 7:
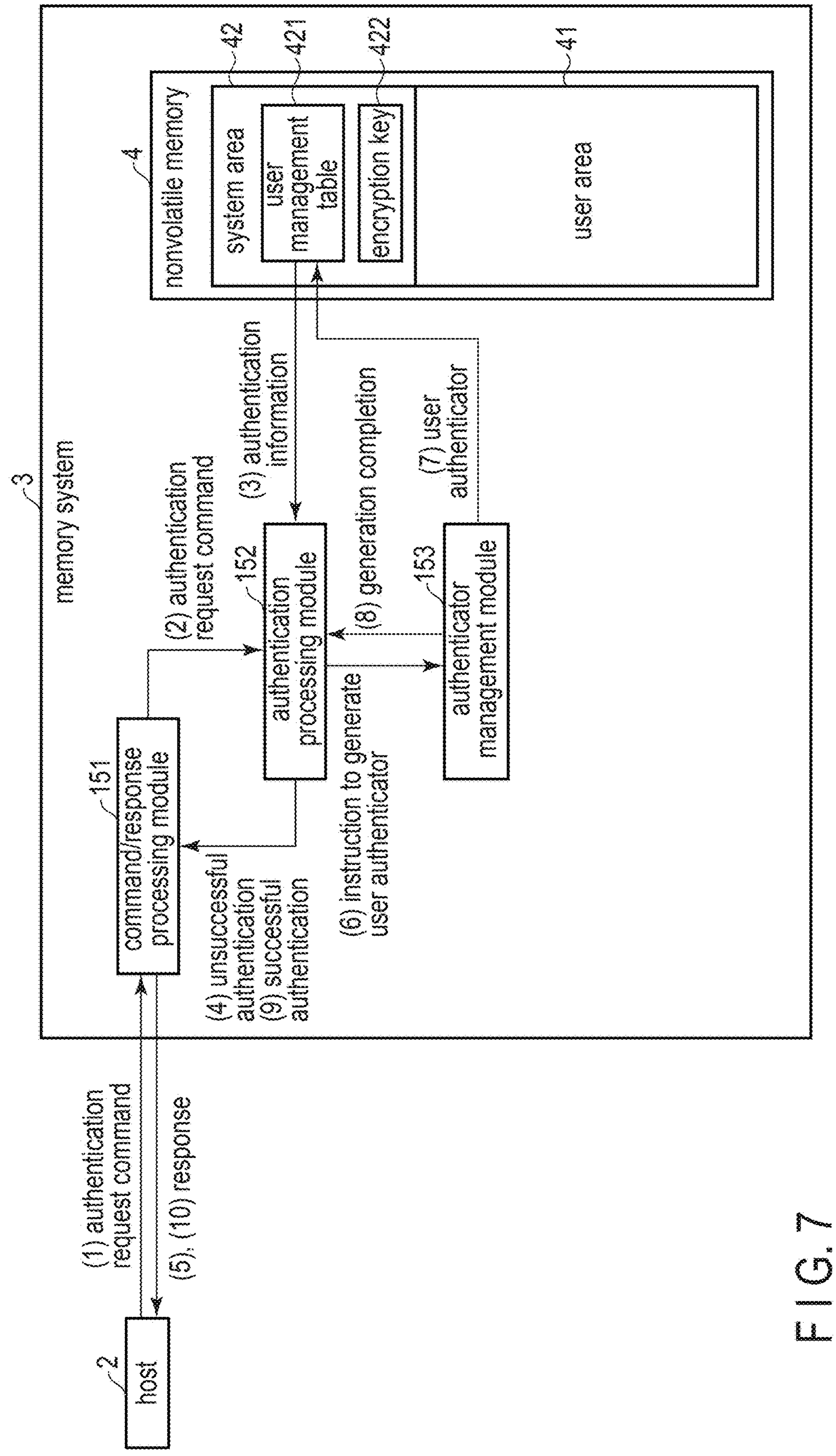
FIG. 7 is a diagram illustrating an example of an authentication operation in the memory system according to the first embodiment.

FIG. 7 illustrates an example of an authentication operation in the memory system 3. The authentication operation is an operation of authenticating a user using the host 2 and generating a user authenticator in a case where the authentication is successful.

First, an authentication request command is transmitted from the host 2 to the memory system 3 ((1) in FIG. 7). The authentication request command includes a user ID and authentication information (target authentication information).

In the memory system 3, the command/response processing module 151 receives an authentication request command from the host 2 via the host I/F 11. The command/response processing module 151 sends the received authentication request command to the authentication processing module 152 ((2) in FIG. 7).

The authentication processing module 152 acquires authentication information (registered authentication information) from the user management table 421 on the basis of the user ID included in the authentication request command ((3) in FIG. 7). Specifically, the authentication processing module 152 identifies, in the user management table 421, an entry that includes the user ID. The authentication processing module 152 acquires the registered authentication information from the authentication information field of the identified entry.

The authentication processing module 152 determines whether or not the target authentication information matches the registered authentication information. In a case where the target authentication information does not match the registered authentication information, the authentication processing module 152 notifies the command/response processing module 151 that the authentication is unsuccessful ((4) in FIG. 7).

In response to the notification of the unsuccessful authentication by the authentication processing module 152, the command/response processing module 151 transmits a response indicating that the authentication of the user is unsuccessful to the host 2 via the host I/F 11 ((5) in FIG. 7).

In contrast, in a case where the target authentication information matches the registered authentication information, the authentication processing module 152 instructs the authenticator management module 153 to generate a user authenticator ((6) in FIG. 7). This instruction includes, for example, the user ID.

In response to the instruction by the authentication processing module 152, the authenticator management module 153 generates the user authenticator. The authenticator management module 153 generates, for example, a random number as the user authenticator. The authenticator management module 153 stores, in the user management table 421, the generated user authenticator that is associated with the user ID ((7) in FIG. 7). Specifically, the authenticator management module 153 identifies, in the user management table 421, an entry that includes the user ID. The authenticator management module 153 sets the generated user authenticator in the user authenticator field of the identified entry. The authenticator management module 153 notifies the authentication processing module 152 that the generation of the user authenticator corresponding to the user ID has been completed ((8) in FIG. 7).

In response to the notification by the authenticator management module 153, the authentication processing module 152 notifies the command/response processing module 151 that the authentication is successful ((9) in FIG. 7).

In response to the notification of the successful authentication by the authentication processing module 152, the command/response processing module 151 transmits a response indicating that the authentication of the user is successful to the host 2 via the host I/F 11 ((10) in FIG. 7).

Through the authentication operation described above, the memory system 3 performs the authentication of the user. In a case where the authentication is successful, the memory system 3 can generate a user authenticator corresponding to the user and store the user authenticator in the user management table 421. The stored user authenticator is used to control access to the nonvolatile memory 4 by the host 2 being used by the user.

Figure 8:
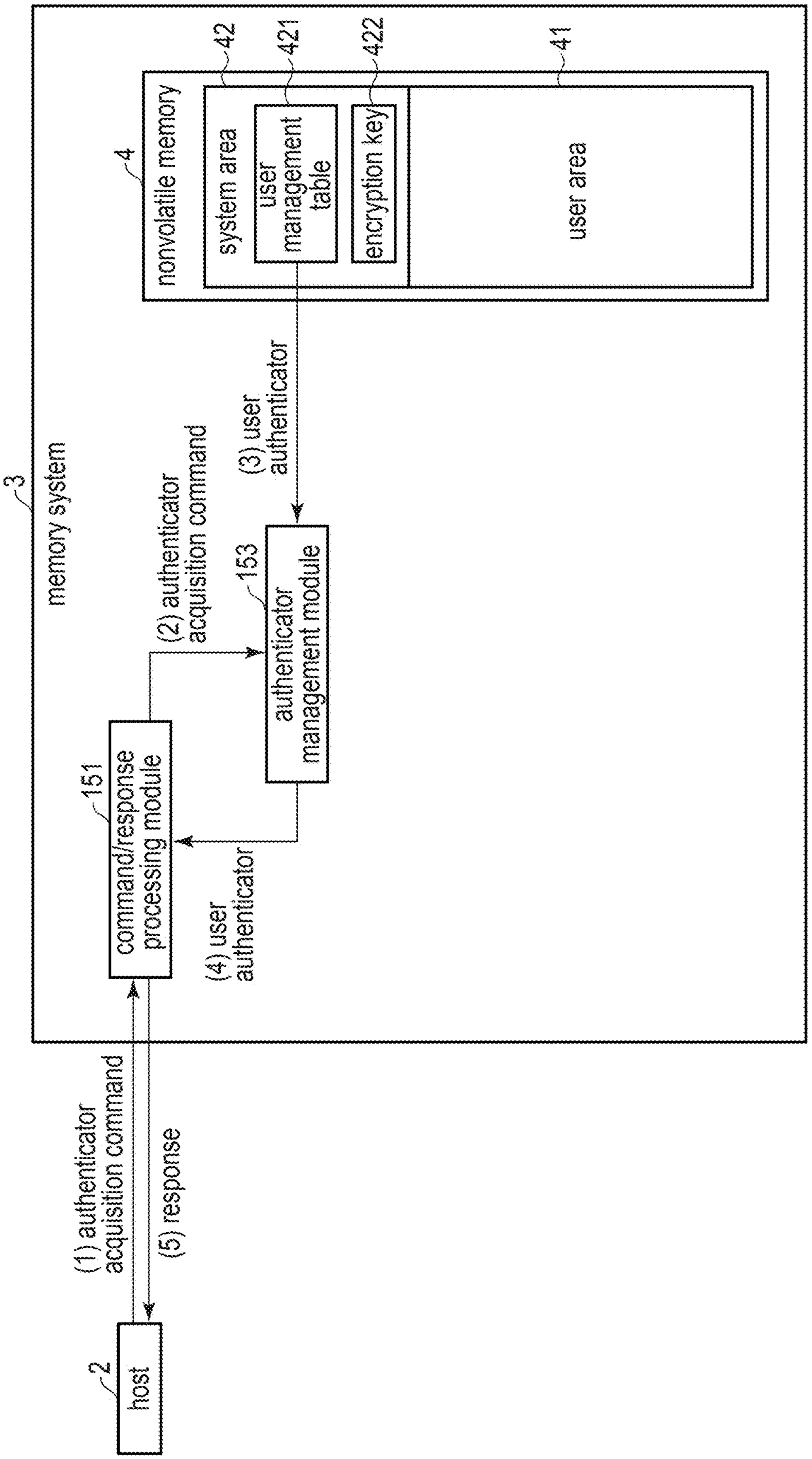
FIG. 8 is a diagram illustrating an example of an authenticator transmission operation in the memory system according to the first embodiment.

FIG. 8 illustrates an example of an authenticator transmission operation in the memory system 3. The authenticator transmission operation is an operation of transmitting, to the host 2, a user authenticator that corresponds to a user using the host 2.

First, an authenticator acquisition command is transmitted from the host 2 to the memory system 3 ((1) in FIG. 8). The authenticator acquisition command includes, for example, a user ID.

In the memory system 3, the command/response processing module 151 receives the authenticator acquisition command from the host 2 via the host I/F 11. The command/response processing module 151 sends the received authenticator acquisition command to the authenticator acquisition management module 153 ((2) in FIG. 8).

The authenticator acquisition management module 153 acquires the user authenticator from the user management table 421 on the basis of the user ID included in the authenticator acquisition command ((3) in FIG. 8). Specifically, the authenticator management module 153 identifies, in the user management table 421, an entry that includes the user ID. The authenticator management module 153 acquires the user authenticator from the user authenticator field of the identified entry. The authenticator management module 153 sends the acquired user authenticator to the command/response processing module 151 ((4) in FIG. 8).

The command/response processing module 151 transmits a response that includes the user authenticator received from the authenticator management module 153, to the host 2 via the host I/F 11 ((5) in FIG. 8).

Through the authenticator transmission operation described above, the memory system 3 can transmit, to the host 2, the user authenticator that corresponds to the user using the host 2.

Figure 9:
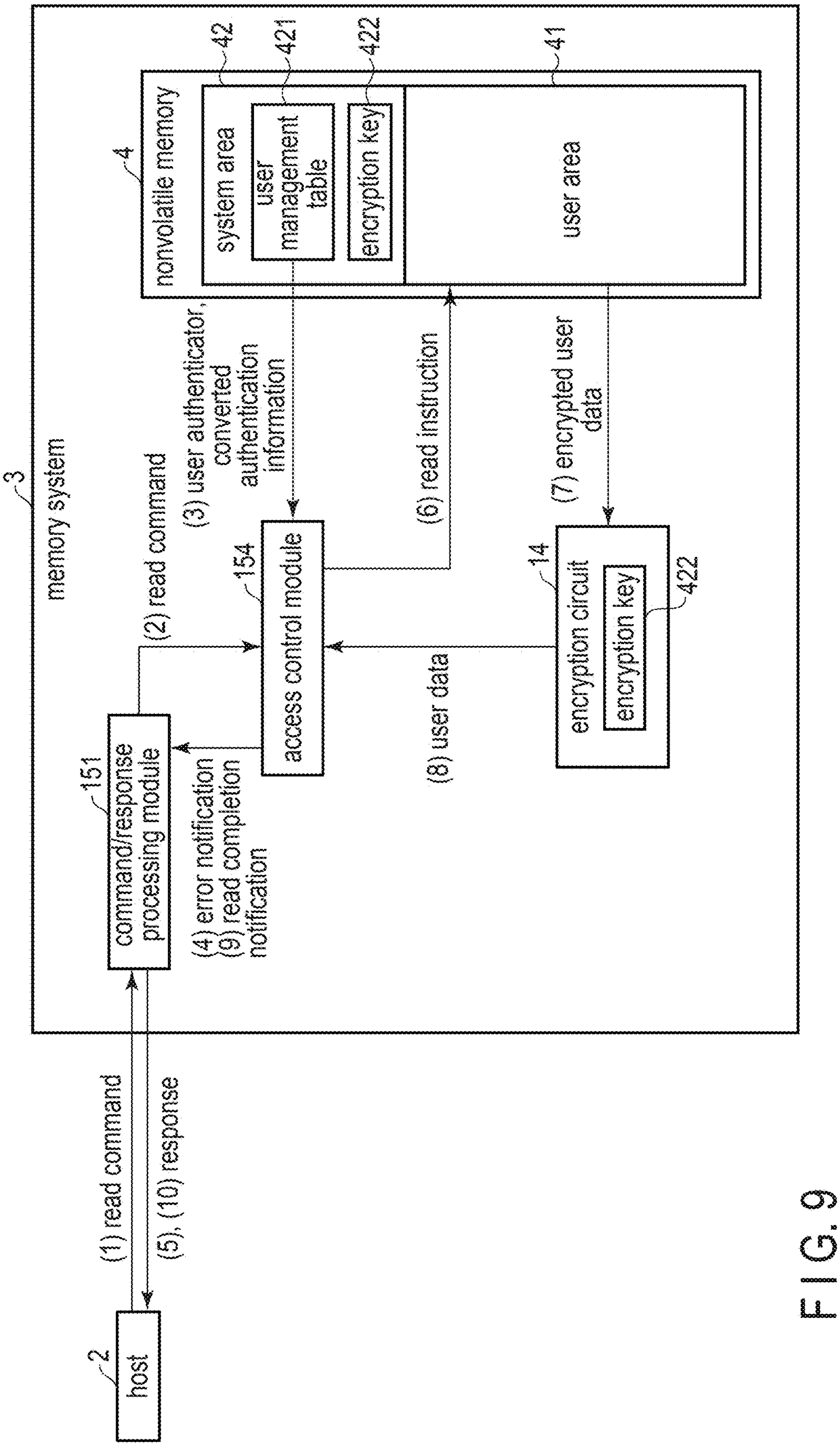
FIG. 9 is a diagram illustrating an example of a data read operation in the memory system according to the first embodiment.

FIG. 9 illustrates an example of a data read operation in the memory system 3. The data read operation is an operation of reading user data from the user area 41 in the nonvolatile memory 4 in response to a request by a user with authentic authority.

First, a read command is transmitted from the host 2 to the memory system 3 ((1) in FIG. 9). Specifically, the host 2 performs the first calculation process on the authentication information of a user (target authentication information), thereby generating the converted authentication information. The host 2 performs the second calculation process using the user authenticator generated by the memory system 3, range information indicative of a target LBA range, and the converted authentication information, thereby generating an access authenticator (target access authenticator). The target access authenticator is, for example, an exclusive-logical-OR of the user authenticator generated by the memory system 3, a start address of the target LBA range, and the converted authentication information. The host 2 then transmits the read command that includes the user ID, the range information, and the target access authenticator, to the memory system 3.

In the memory system 3, the command/response processing module 151 receives the read command from the host 2 via the host I/F 11. The command/response processing module 151 sends the received read command to the access control module 154 ((2) in FIG. 9).

Based on the user ID included in the read command, the access control module 154 acquires the user authenticator (registered user authenticator) and the converted authentication information (registered converted authentication information) from the user management table 421 ((3) in FIG. 9). Specifically, the access control module 154 identifies, in the user management table 421, an entry that includes the user ID. The access control module 154 acquires the registered user authenticator from the user authenticator field of the identified entry, and acquires the registered converted authentication information from the converted authentication information field of the identified entry. Note that the access control module 154 may acquire the registered converted authentication information by acquiring the authentication information (registered authentication information) from the authentication information field of the identified entry and performing the first calculation process on the acquired authentication information.

The access control module 154 verifies the authenticity of the target access authenticator included in the read command by using the registered user authenticator, the registered converted authentication information, and the range information that is included in the read command. Specifically, the access control module 154 performs the second calculation process using the registered user authenticator, the registered converted authentication information, and the range information, thereby generating a verification authenticator. The generated verification authenticator is, for example, an exclusive-logical-OR of the registered user authenticator, the registered converted authentication information, and the start address of the target LBA range indicated by the range information. The access control module 154 determines whether or not the authenticity of the target access authenticator has been confirmed depending on whether or not the generated verification authenticator matches the target access authenticator.

In a case where the generated verification authenticator does not match the target access authenticator, the access control module 154 notifies the command/response processing module 151 of an error ((4) in FIG. 9).

In response to the notification of the error by the access control module 154, the command/response processing module 151 transmits a response indicative of the error on the read command to the host 2 ((5) in FIG. 9).

On the other hand, in a case where the generated verification authenticator matches the target access authenticator, the access control module 154 instructs the nonvolatile memory 4 to read data on the basis of the range information and the logical-to-physical address conversion table 52 ((6) in FIG. 9). Specifically, the access control module 154 uses the logical-to-physical address conversion table 52 to acquire a physical address that corresponds to each LBA within the target LBA range, which is indicated by the range information. The access control module 154 instructs the nonvolatile memory 4 to read data based on the acquired physical address via the memory I/F 13.

The data read from the nonvolatile memory 4 in response to the instruction by the access control module 154 is transferred to the encryption circuit 14 ((7) in FIG. 9). The data read from the nonvolatile memory 4 is, for example, encrypted user data (encrypted data).

The encryption circuit 14 decrypts the encrypted data with the encryption key 422, thereby generating user data. The encryption circuit 14 acquires, for example, the encryption key 422 associated with the user ID (or the registered user authenticator) from the system area 42. Alternatively, the encryption circuit 14 may acquire, from the system area 42, the encryption key 422 associated with a partial range that includes the target LBA range. The encryption circuit 14 sends the generated user data to the access control module 154 ((8) in FIG. 9). Note that the user data may be stored in a buffer area included in the DRAM 5, etc.

The access control module 154 notifies the command/response processing module 151 that the reading of the user data has been completed ((9) in FIG. 9).

In response to the notification by the access control module 154 that the reading of the user data has been completed, the command/response processing module 151 transmits, to the host 2, the user data and a response indicating that the reading of the user data has been completed ((10) in FIG. 9).

Through the data read operation described above, in response to a read command that includes an authentic access authenticator, the memory system 3 can read user data from the user area 41 and provide the user data to the host 2. In addition, the memory system 3 can prohibit reading of user data in response to a read command that does not include an authentic access authenticator.

Figure 10:
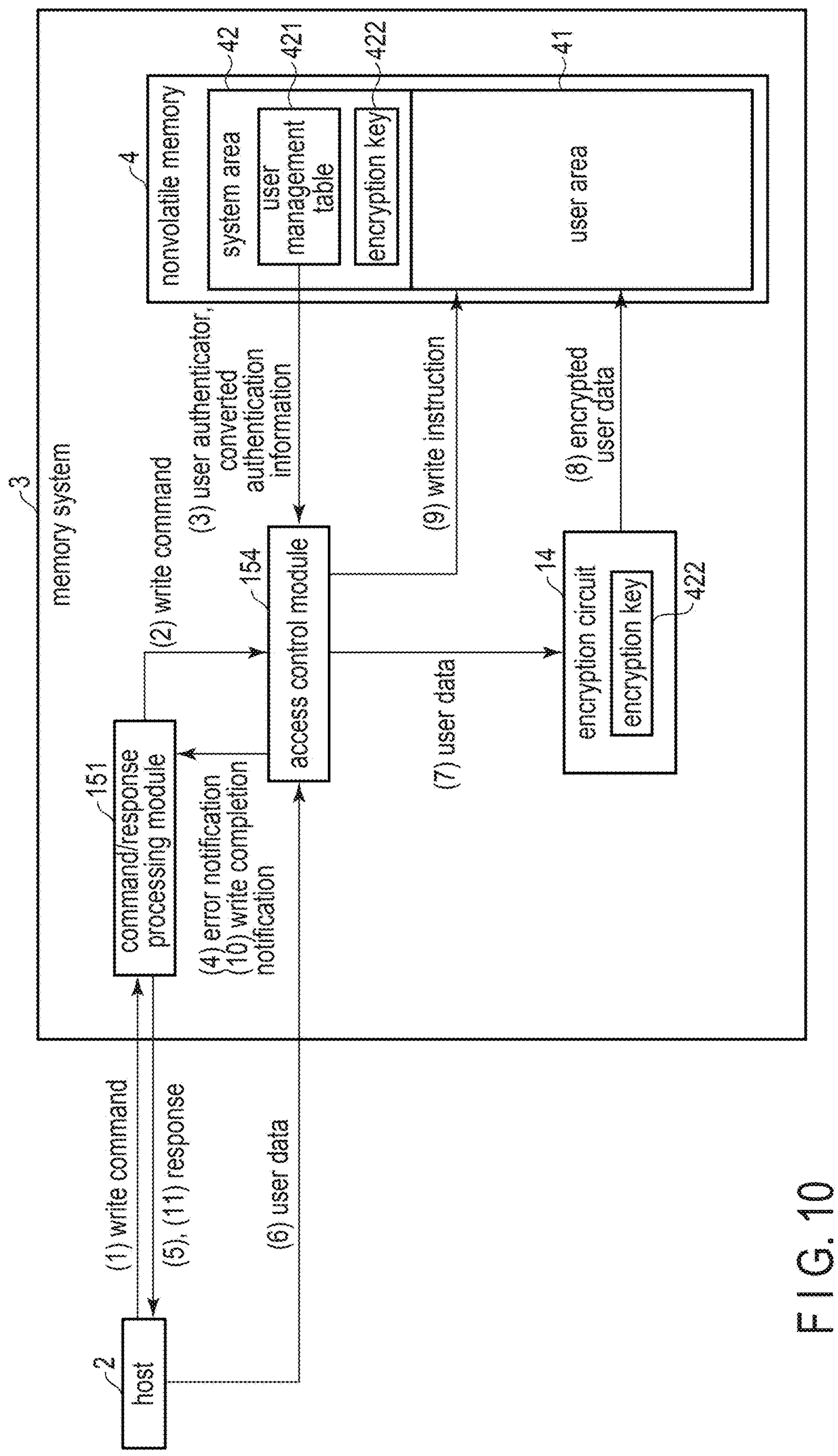
FIG. 10 is a diagram illustrating an example of a data write operation in the memory system according to the first embodiment.

FIG. 10 illustrates an example of a data write operation in the memory system 3. The data write operation is an operation of writing user data into the user area 41 in the nonvolatile memory 4 in response to a request by a user with authentic authority.

First, a write command is transmitted from the host 2 to the memory system 3 ((1) in FIG. 10). Specifically, the host 2 performs the first calculation process on the authentication information of a user (target authentication information), thereby generating the converted authentication information. The host 2 performs the second calculation process using the user authenticator generated by the memory system 3, range information indicative of a target LBA range, and the converted authentication information, thereby generating an access authenticator (target access authenticator). The host 2 then transmits the write command that includes a user ID, the range information, and the target access authenticator, to the memory system 3.

In the memory system 3, the command/response processing module 151 receives the write command from the host 2 via the host I/F 11. The command/response processing module 151 sends the received write command to the access control module 154 ((2) in FIG. 10).

The access control module 154 acquires, based on the user ID included in the write command, the user authenticator (registered user authenticator) and the converted authentication information (registered converted authentication information) from the user management table 421 ((3) in FIG. 10). Specifically, the access control module 154 identifies, in the user management table 421, an entry that includes the user ID. The access control module 154 acquires the registered user authenticator from the user authenticator field of the identified entry, and acquires the registered converted authentication information from the converted authentication information field of the identified entry.

The access control module 154 verifies the authenticity of the target access authenticator included in the write command by using the registered user authenticator, the registered converted authentication information, and the range information that is included in the write command. Specifically, the access control module 154 performs the second calculation process using the registered user authenticator, the registered converted authentication information, and the range information, thereby generating a verification authenticator. The generated verification authenticator is, for example, an exclusive-logical-OR of the registered user authenticator, the registered converted authentication information, and a start address of the target LBA range indicated by the range information. The access control module 154 determines whether or not the authenticity of the target access authenticator has been confirmed depending on whether or not the generated verification authenticator matches the target access authenticator.

In a case where the generated verification authenticator does not match the target access authenticator, the access control module 154 notifies the command/response processing module 151 of an error ((4) in FIG. 10).

In response to the notification of the error by the access control module 154, the command/response processing module 151 transmits a response indicative of the error on the write command to the host 2 ((5) in FIG. 10).

On the other hand, in a case where the generated verification authenticator matches the target access authenticator, the access control module 154 transfers, from the host 2, user data to be written into the user area 41 in the nonvolatile memory 4 in accordance with the write command ((6) in FIG. 10). Note that after the write command is received, the user data may be transferred from the host 2 and stored in a buffer area in the DRAM 5, etc. The access control module 154 sends the user data to the encryption circuit 14 ((7) in FIG. 10).

The encryption circuit 14 encrypts, for example, the user data with the encryption key 422, thereby generating encrypted user data (encrypted data). The encryption circuit 14 acquires, for example, the encryption key 422 associated with the user ID (or the registered user authenticator) from the system area 42. Alternatively, the encryption circuit 14 may acquire, from the system area 42, the encryption key 422 associated with a partial range that includes the target LBA range. The encryption circuit 14 transfers the generated encrypted data to the nonvolatile memory 4 via the memory I/F 13 ((8) in FIG. 10).

The access control module 154 instructs the nonvolatile memory 4 to write the transferred encrypted data via the memory I/F 13 ((9) in FIG. 10). In the nonvolatile memory 4, the encrypted data is written into the user area 41 in accordance with the instruction by the access control module 154. The access control module 154 updates the logical-to-physical address conversion table 52 to associate a physical address in which the encrypted data has been written with a corresponding LBA within the target LBA range. The access control module 154 then notifies the command/response processing module 151 that the writing of the user data has been completed ((10) in FIG. 10).

In response to the notification by the access control module 154 that the writing of the user data has been completed, the command/response processing module 151 transmits a response indicating that the writing of the user data has been completed to the host 2 ((11) in FIG. 10).

Through the data write operation described above, the memory system 3 can write user data into the user area 41 in response to a write command that includes an authentic access authenticator. In addition, the memory system 3 can prohibit writing of user data in accordance with a write command that does not include an authentic access authenticator.

Here, procedures of a process executed in the host 2 will be described with reference to a flowchart of FIG. 11.

Figure 11:
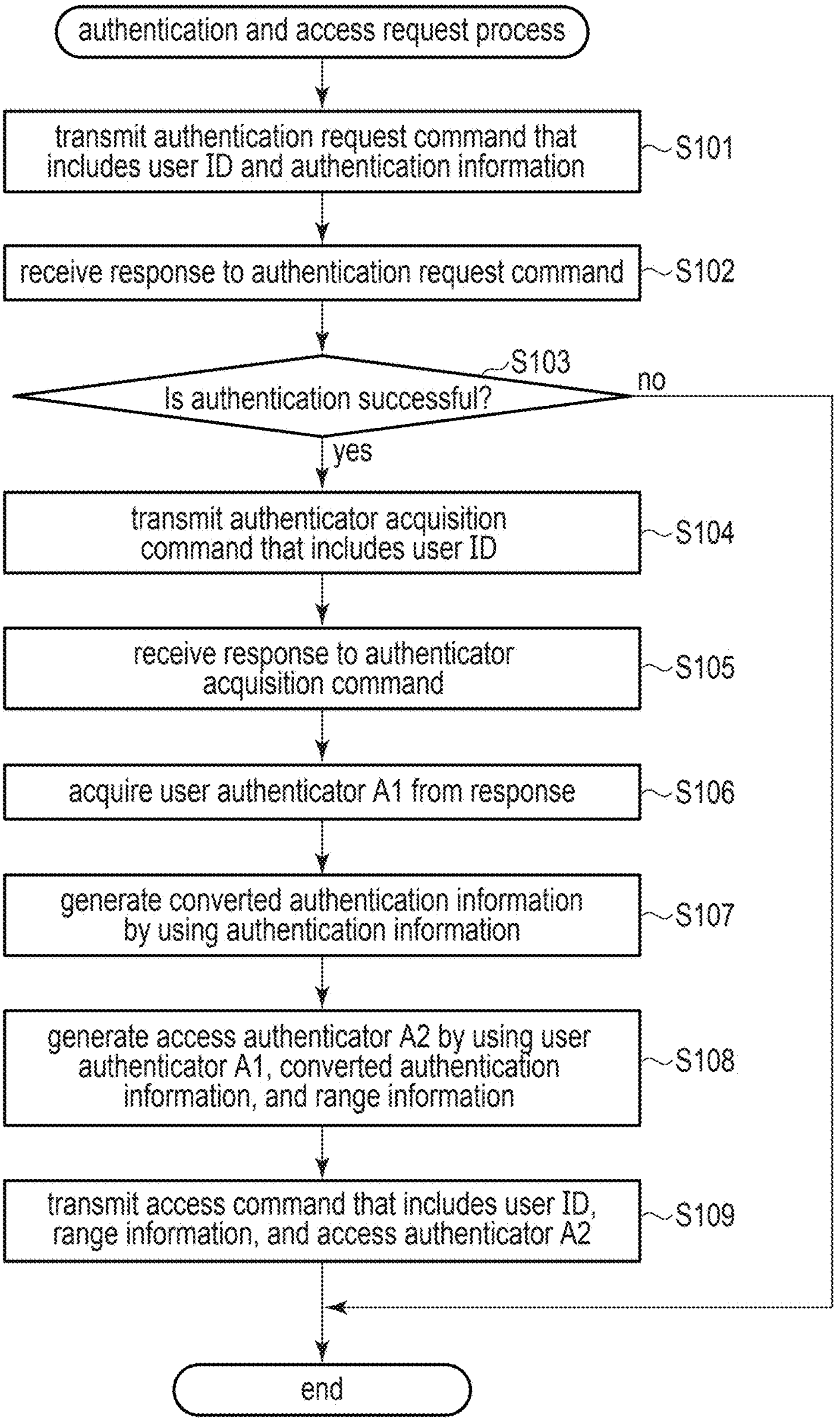
FIG. 11 is a flowchart illustrating an example of the procedure of an authentication and access request process executed in the host, which is connected to the memory system according to the first embodiment.

FIG. 11 is a flowchart illustrating an example of the procedure of an authentication and access request process executed by the CPU 21 of the host 2. The authentication and access request process is a process of requesting the memory system 3 to authenticate a user and in response to the authentication being successful, requesting access to the nonvolatile memory 4. The CPU 21 executes the authentication and access request process, for example, in a case where it is necessary to access the nonvolatile memory 4.

First, the CPU 21 transmits an authentication request command that includes a user ID and authentication information of a user to the memory system 3 (step S101). The CPU 21 receives a response to the authentication request command from the memory system 3 (step S102). Then, the CPU 21 determines whether or not the authentication of the user is successful, based on the received response (step S103).

In a case where the user authentication is unsuccessful (no in step S103), the CPU 21 ends the authentication and access request process. In other words, since the authentication is unsuccessful, the host 2 used by the user cannot access the nonvolatile memory 4 of the memory system 3.

In a case where the user authentication is successful (yes in step S103), the CPU 21 transmits an authenticator acquisition command that includes the user ID to the memory system 3 (step S104). The CPU 21 receives a response to the authenticator acquisition command from the memory system 3 (step S105). The CPU 21 then acquires a user authenticator (hereinafter, referred to as a user authenticator A1) from the received response (step S106).

Next, the CPU 21 performs the first calculation process on the authentication information of the user, thereby generating converted authentication information (step S107). The converted authentication information is, for example, a hash value of the authentication information. The CPU 21 performs the second calculation process using the user authenticator A1, the converted authentication information, and range information, thereby generating an access authenticator (step S108). Hereinafter, this access authenticator is referred to as an access authenticator A2. The access authenticator A2 is, for example, an exclusive-logical-OR of the user authenticator A1, the converted authentication information, and a start address of a target LBA range indicated by the range information. Then, the CPU 21 transmits an access command that includes the user ID, the range information, and the access authenticator A2, to the memory system 3 (step S109), and ends the authentication and access request process.

Through the authentication and access request process described above, the host 2 can access the nonvolatile memory 4 of the memory system 3 in a case where the user has authentic authority.

Next, the procedure of each of processes executed in the memory system 3 will be described with reference to flowcharts from FIG. 12 to FIG. 14.

Figure 12:
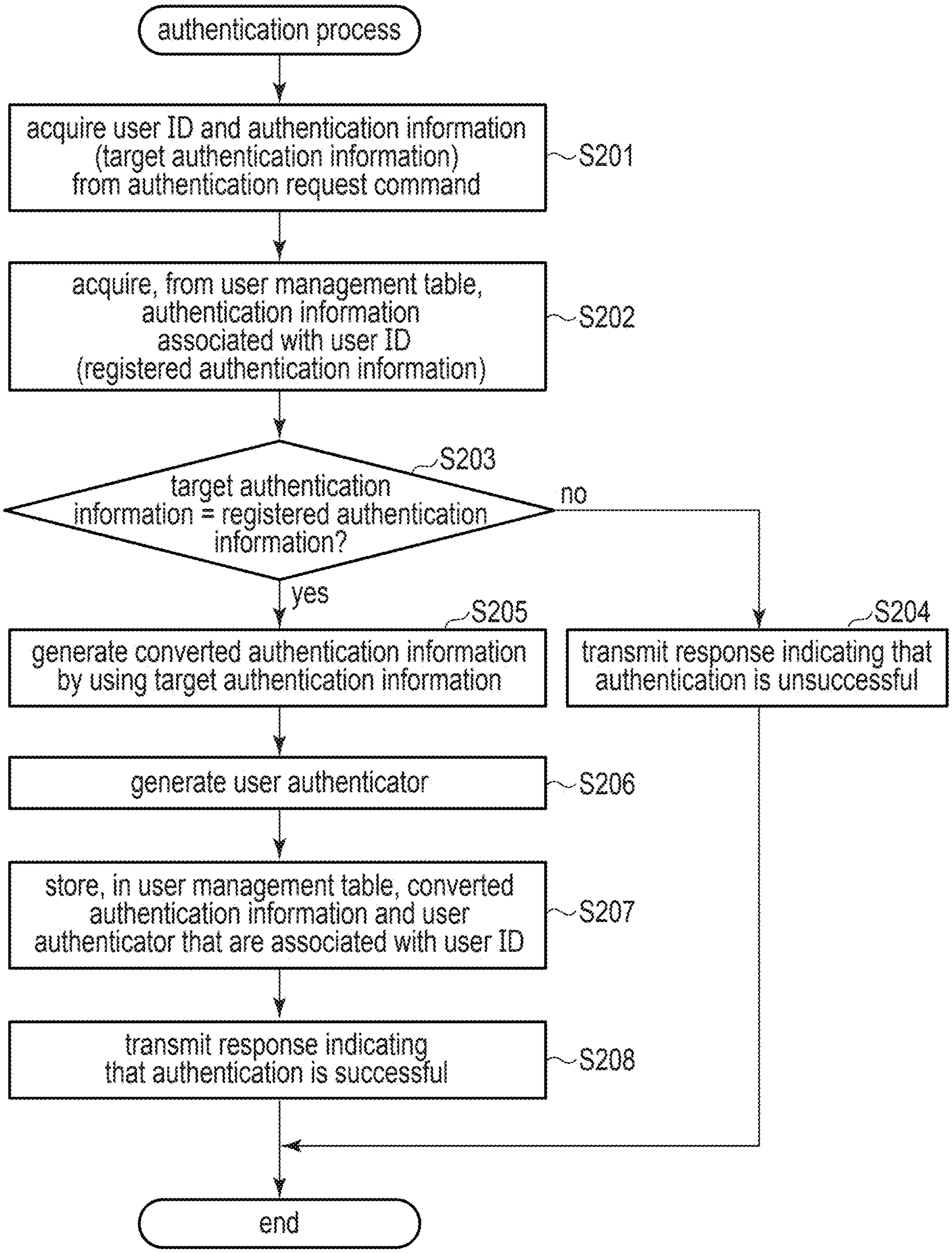
FIG. 12 is a flowchart illustrating an example of the procedure of an authentication process executed in the memory system according to the first embodiment.

FIG. 12 is a flowchart illustrating an example of the procedure of an authentication process executed by the CPU 15 of the memory system 3. The authentication process is a process of authenticating a user on the basis of authentication information and generating a user authenticator in a case where the authentication is successful. The CPU 15 executes the authentication process in response to receiving an authentication request command from the host 2.

First, the CPU 15 acquires a user ID and authentication information (target authentication information) from the authentication request command (step S201). The CPU 15 acquires authentication information associated with the user ID (registered authentication information) from the user management table 421 (step S202). The CPU 15 then determines whether or not the target authentication information matches the registered authentication information (step S203).

In a case where the target authentication information is different from the registered authentication information (no in step S203), the CPU 15 transmits, to the host 2, a response indicating that the authentication of the user is unsuccessful (step S204), and ends the authentication process.

In a case where the target authentication information matches the registered authentication information (yes in step S203), the CPU 15 performs the first calculation process on the target authentication information (=registered authentication information), thereby generating converted authentication information (step S205). The converted authentication information is, for example, a hash value of the target authentication information. The CPU 15 also generates a user authenticator (step S206). The CPU 15 stores, in the user management table 421, the generated converted authentication information and the user authenticator that are associated with the user ID (step S207). The CPU 15 then transmits, to the host 2, a response indicating that the authentication is successful (step S208), and ends the authentication process.

Through the authentication process described above, the memory system 3 can authenticate the user who is using the host 2, based on the authentication information. In a case where the user authentication is successful, the memory system 3 can generate the user authenticator for the host 2 to access the nonvolatile memory 4.

Figure 13:
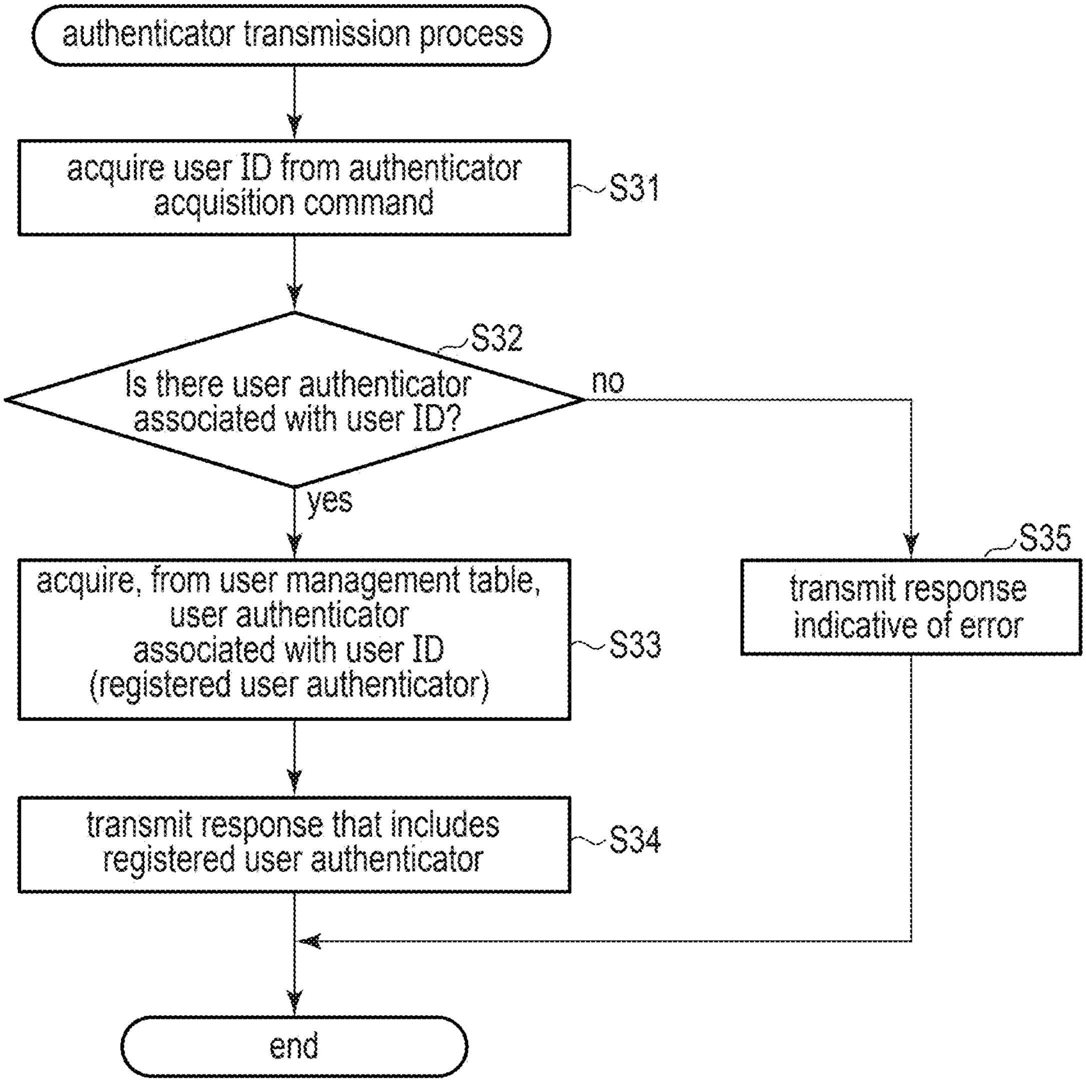
FIG. 13 is a flowchart illustrating an example of the procedure of an authenticator transmission process executed in the memory system according to the first embodiment.

FIG. 13 is a flowchart illustrating an example of the procedure of an authenticator transmission process executed by the CPU 15 of the memory system 3. The authenticator transmission process is a process of transmitting, to the host 2, a user authenticator that corresponds to a user using the host 2. The CPU 15 executes the authenticator transmission process in response to receiving an authenticator acquisition command from the host 2.

First, the CPU 15 acquires a user ID from the authenticator acquisition command (step S31). The CPU 15 determines whether or not the user management table 421 includes a user authenticator associated with the acquired user ID (step S32). Specifically, the CPU 15 determines, for example, whether or not, in the user management table 421, any user authenticator is set in an entry that includes the acquired user ID.

In a case where the user management table 421 includes the user authenticator associated with the user ID (yes in step S32), the CPU 15 acquires the user authenticator (registered user authenticator) from the user management table 421 (step S33). The CPU 15 then transmits a response including the registered user authenticator to the host 2 (step S34) and ends the authenticator transmission process.

In a case where the user management table 421 includes no user authenticator associated with the user ID (no in step 32), the CPU 15 transmits a response indicative of an error to the host 2 (step 35) and ends the authenticator transmission process. For example, in a case where authentication of the user has failed and thus any user authenticator corresponding to the user has not yet been generated, or in a case where a user authenticator corresponding to the user has already been discarded, the user management table 421 includes no user authenticator associated with the user ID.

Through the authenticator transmission process described above, the memory system 3 can provide the user authenticator to the host 2 in a case where the user authenticator corresponding to the user using the host 2 has been generated (i.e., in a case where the user management table 421 includes the user authenticator).

Figure 14:
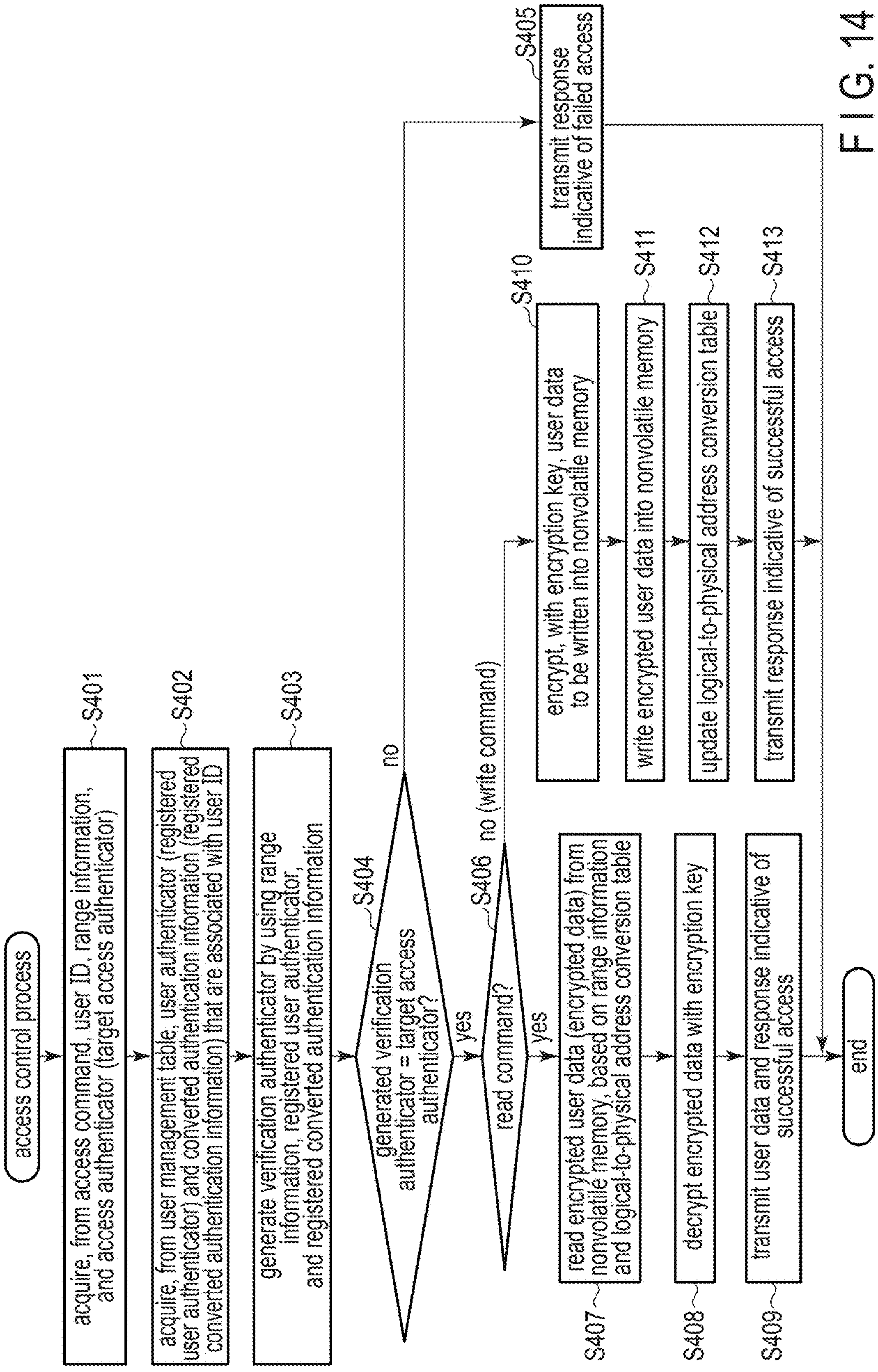
FIG. 14 is a flowchart illustrating an example of the procedure of an access control process executed in the memory system according to the first embodiment.

FIG. 14 is a flowchart illustrating an example of the procedure of an access control process executed by the CPU

15 of the memory system 3. The access control process is a process of controlling access to the nonvolatile memory 4 by the host 2 being used by a user with use of an access authenticator. The CPU 15 executes the access control process in response to receiving an access command from the host 2. Here, it is assumed that the access command is either a read command or a write command.

First, the CPU 15 acquires a user ID, range information, and an access authenticator (target access authenticator) from the access command (step S401). The CPU 15 acquires, from the user management table 421, a user authenticator (registered user authenticator) and converted authentication information (registered converted authentication information) that are associated with the acquired user ID (step S402). The CPU 15 performs the second calculation process using the range information, the registered user authenticator, and the registered converted authentication information, thereby generating a verification authenticator (step S403). The CPU 15 then determines whether or not the generated verification authenticator matches the target access authenticator (step S404). In other words, the CPU 15 determines whether or not the authenticity of the target access authenticator has been confirmed.

In a case where the generated verification authenticator is different from the target access authenticator (no in step S404), the CPU 15 transmits, to the host 2, a response indicating that the access has failed (step S405), and ends the access control process. In other words, in a case where the CPU 15 has received the access command from the host 2 and the access command includes the access authenticator whose authenticity has not been confirmed, the CPU 15 does not perform a process in accordance with the access command.

In a case where the generated verification authenticator matches the target access authenticator (yes in step S404), the CPU 15 determines whether the access command is a read command or not (step S406).

In a case where the access command is a read command (yes in step S406), the CPU 15 reads encrypted user data (encrypted data) from the nonvolatile memory 4, based on the range information and the logical-to-physical address conversion table 52 (step S407). The CPU 15 decrypts the read encrypted data by using the encryption key 422 associated with the user ID (or the registered user authenticator), thereby generating user data (step S408). The CPU 15 transmits, to the host 2, the user data obtained by the decryption and a response indicating that the access (i.e., the reading of the user data) is successful (step S409), and ends the access control process.

In a case where the access command is a write command (no in step S406), the CPU 15 encrypts user data to be written into the nonvolatile memory 4 in accordance with the write command by using the encryption key 422 associated with the user ID (or the registered user authenticator), thereby generating encrypted user data (encrypted data) in step S410. The CPU 15 writes the generated encrypted data into the nonvolatile memory 4 (step S411). The CPU 15 updates the logical-to-physical address conversion table 52 to associate a physical address in which the encrypted data has been written with a corresponding LBA within the LBA range indicated by the range information (step S412). The CPU 15 then transmits, to the host 2, a response indicating that the access (i.e., the writing of the user data) is successful (step S413), and ends the access control process.

Through the access control process described above, the memory system 3 can control access to the nonvolatile memory 4 by the host 2 by using the access authenticator. Specifically, in a case where the authenticity of the access authenticator included in the access command has been confirmed, the memory system 3 executes the process in accordance with the access command. In contrast, in a case where the authenticity of the access authenticator included in the access command has not been confirmed, the memory system 3 does not execute the process in accordance with the access command. As a result, the memory system 3 can permit the execution of the process in accordance with the access command that includes the authentic access authenticator, but prohibit the execution of the process in accordance with the access command that does not include the authentic access authenticator. Therefore, the memory system 3 can enhance the security of access to the nonvolatile memory 4.

Second Embodiment

In the first embodiment, the memory system 3 performs authentication of a user in response to an authentication request command that includes authentication information. In a case where the authentication of the user is successful, the memory system 3 generates a user authenticator (registered user authenticator) that is associated with the user (more specifically, a user ID of the user). The memory system 3 transmits the registered user authenticator to the host 2 in response to an authenticator acquisition command. In addition, when having received an access command that includes a user ID, range information, and an access authenticator (target access authenticator), the memory system 3 confirms the authenticity of the target access authenticator by using the range information, the registered user authenticator, and authentication information (more specifically, converted authentication information) that are associated with the user ID. When having confirmed the authenticity of the target access authenticator, the memory system 3 executes a process in accordance with the access command.

In contrast, a memory system 3 according to a second embodiment generates a user authenticator (registered user authenticator) and transmits the user authenticator to a host 2 in response to an authenticator acquisition command, without receiving authentication information from the host 2. In the same manner as in the first embodiment, the memory system 3 executes a process in accordance with an access command when the authenticity of a target access authenticator has been confirmed.

The configuration of the memory system 3 according to the second embodiment is the same as that of the memory system 3 of the first embodiment. The second embodiment and the first embodiment are different in the procedure of a process of generating and transmitting a user authenticator (registered user authenticator) to the host 2. In the following description, points different from those of the first embodiment will be mainly explained.

Figure 15:
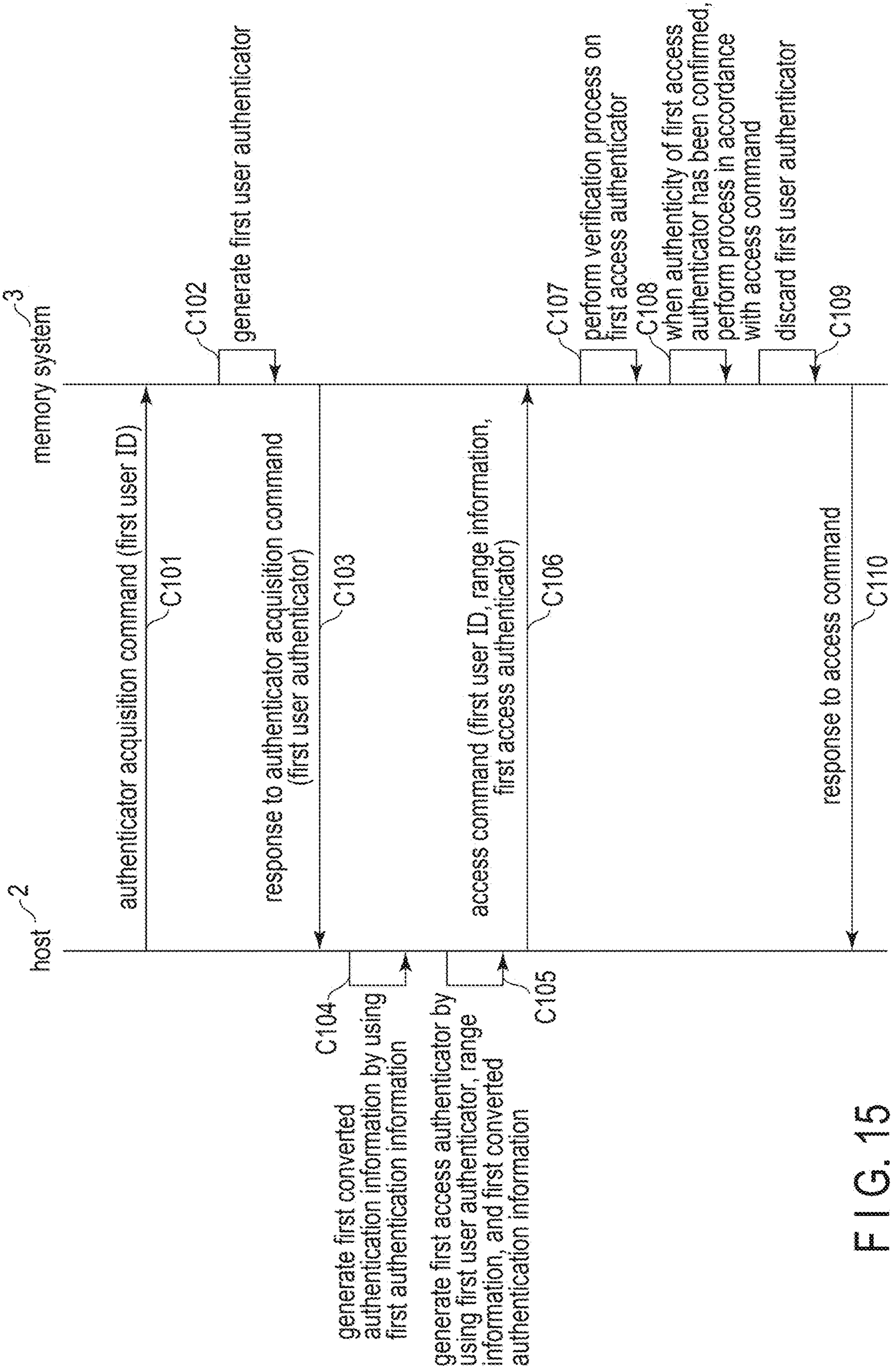
FIG. 15 is a sequence diagram illustrating an example of an authenticator generation and access operation in a host and a memory system according to a second embodiment.

FIG. 15 is a sequence diagram illustrating an example of an authenticator generation and access operation in the host 2 and the memory system 3. The authenticator generation and access operation is an operation of permitting a user with authentic authority to access a range allocated to the user, but prohibiting access to this range by another user. Here, a case where a user using the host 2 is a first user with authentic authority will be explained.

First, the host 2 transmits an authenticator acquisition command to the memory system 3 (C101). The authenticator acquisition command includes, for example, a user ID of the first user (first user ID).

In response to the authenticator acquisition command received from the host 2, the memory system 3 generates a user authenticator associated with the first user ID (first user authenticator) in step C102. The memory system 3 sets, in the user management table 421, the first user authenticator in the user authenticator field of an entry that includes the first user ID. As a result, the first user authenticator is associated with the first user ID. The memory system 3 then transmits a response that includes the first user authenticator to the host 2 as a response to the authenticator acquisition command (C103).

After receiving the response that includes the first user authenticator, the host 2 performs the first calculation process on authentication information of the first user (first authentication information), thereby generating converted authentication information (C104). Hereinafter, this converted authentication information is also referred to as first converted authentication information. In step C105, the host 2 generates an access authenticator (hereinafter, also referred to as a first access authenticator) by using the first user authenticator, range information, and the first converted authentication information, in the same manner as the first embodiment described with reference to FIG. 5.

The host 2 then transmits an access command to access the nonvolatile memory 4 to the memory system 3 (C106). The access command includes, for example, the first user ID, the range information, and the first access authenticator.

In response to the access command received from the host 2, in step C107, the memory system 3 performs a verification process on the first access authenticator included in the access command, in the same manner as the first embodiment described with reference to FIG. 5. The verification process is a process of verifying the authenticity of the first access authenticator.

When the authenticity of the first access authenticator has been confirmed, the memory system 3 performs a process in accordance with the access command (C108). In addition, after determining whether the authenticity of the first access authenticator has been confirmed or not (that is, after determining that the authenticity of the first access authenticator has been confirmed or that the authenticity of the first access authenticator has not been confirmed), the memory system 3 discards the first user authenticator (C109). Specifically, the memory system 3 deletes, in the user management table 421, the first user authenticator from the entry that includes the first user ID. The memory system 3 then transmits a response to the access command to the host 2 (C110).

Through the authenticator generation and access operation described above, the memory system 3 can perform control so that only the first user with authentic authority can access only a range permitted for the first user.

Specifically, in response to the authenticator acquisition command without receiving the authentication information from the host 2, the memory system 3 generates the first user authenticator and transmits the first user authenticator to the host 2. This prevents, for example, the authentication information from leaking because of an authentication request command, which includes the authentication information, being sniffed.

In addition, as the access authenticator included in the access command, the first access authenticator is used and the first access authenticator is obtained by performing the second calculation process using the first user authenticator, the range information, and the first converted authentication information. As a result, even in a case where the access command has been sniffed, since the first access authenticator included in the access command is generated using the range information, the memory system 3 can prevent access to a range that is different from the range designated in the range information. In other words, the memory system 3 can prevent a replay attack on any range using the sniffed access command.

Furthermore, even in a case where the access command has been sniffed, the memory system 3 discards the first user authenticator in an operation responding to the access command. Therefore, even if a replay attack using the sniffed access command is performed, since the first user authenticator has already been discarded, the memory system 3 determines that the authenticity of the first access authenticator included in an access command by the replay attack has not been confirmed. Thus, the memory system 3 does not execute the process in accordance with the access command by the replay attack. Therefore, the memory system 3 can prevent the replay attack using the sniffed access command.

In this manner, even if one or more of commands and responses transferred between the memory system 3 and the host 2 used by the first user have been sniffed, the memory system 3 can prevent unauthorized access to the nonvolatile memory 4 with information obtained through the sniffing.

A CPU 15 of the memory system 3 functions as, for example, a command/response processing module 151, an authenticator management module 153, and an access control module 154.

The command/response processing module 151 receives, via the host I/F 11, a command issued by the host 2. The command issued by the host 2 is, for example, an authenticator acquisition command or an access command. The command/response processing module 151 causes at least one of the authenticator management module 153 and the access control module 154 to execute a process in accordance with the received command. In addition, the command/response processing module 151 transmits a response based on the execution result of the process in accordance with the command, to the host 2 via the host I/F 11.

The authenticator management module 153 generates a user authenticator and manages the generated user authenticator. The authenticator management module 153 uses, for example, the user management table 421 to manage the user authenticator.

When the command/response processing module 151 has received an authenticator acquisition command from the host 2, the authenticator management module 153 performs a process of generating a user authenticator and transmitting the user authenticator to the host 2. Specifically, the authenticator management module 153 acquires a user ID from the authenticator acquisition command. The authenticator management module 153 generates the user authenticator. The authenticator management module 153 stores the generated user authenticator associated with the user ID, in the user management table 421. The generated user authenticator is also transmitted to the host 2 by the command/response processing module 151 as a response to the authenticator acquisition command.

In addition, for example, when a process in accordance with an access command that includes a user ID has been performed, the authenticator management module 153 discards the user authenticator associated with the user ID. Specifically, for example, the authenticator management module 153 deletes the user authenticator from the user management table 421.

When the command/response processing module 151 has received an access command from the host 2, the access control module 154 controls access to the nonvolatile memory 4. The access command includes, for example, a user ID (target user ID), range information, and an access authenticator (target access authenticator).

Specifically, the access control module 154 verifies the authenticity of the target access authenticator by using registered authentication information and registered user authenticator that are associated with the target user ID. When the authenticity of the target access authenticator has been confirmed, the access control module 154 executes a process for the nonvolatile memory 4 in accordance with the access command. When the authenticity of the target access authenticator has not been confirmed, the access control module 154 does not execute the process for the nonvolatile memory 4 in accordance with the access command.

The verification of the authenticity of the target access authenticator is the same as in the first embodiment, and detailed descriptions are omitted.

With the configuration described above, the command/response processing module 151, the authenticator management module 153, and the access control module 154 can permit access to the nonvolatile memory 4 by a user with authentic authority, but prohibit access to the nonvolatile memory 4 by a user without authentic authority. The operations of the command/response processing module 151, the authenticator management module 153, and the access control module 154 will be described in more detail, with reference to FIG. 16 to FIG. 18.

Figure 16:
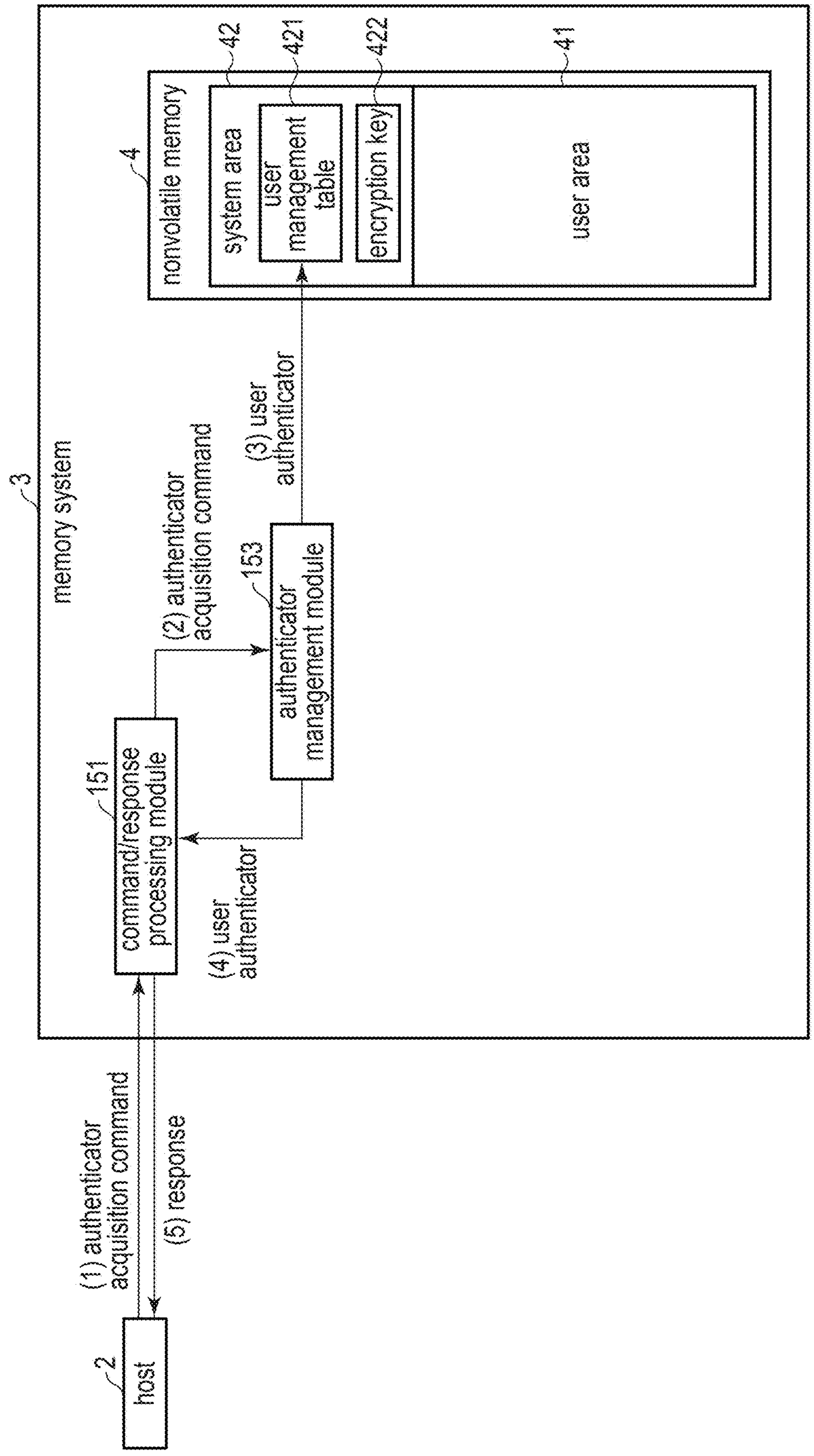
FIG. 16 is a diagram illustrating an example of an authenticator generation and transmission operation in the memory system according to the second embodiment.

FIG. 16 illustrates an example of an authenticator generation and transmission operation in the memory system 3. The authenticator generation and transmission operation is an operation of generating a user authenticator that corresponds to a user who is using the host 2, and transmitting the generated user authenticator to the host 2.

First, an authenticator acquisition command is transmitted from the host 2 to the memory system 3 ((1) in FIG. 16). The authenticator acquisition command includes, for example, a user ID.

In the memory system 3, the command/response processing module 151 receives the authenticator acquisition command from the host 2 via the host I/F 11. The command/response processing module 151 sends the received authenticator acquisition command to the authenticator management module 153 ((2) in FIG. 16).

In response to the authenticator acquisition command received from the command/response processing module 151, the authenticator management module 153 generates a user authenticator. The authenticator management module 153 stores the generated user authenticator associated with the user ID, in the user management table 421 ((3) in FIG. 16). Specifically, the authenticator management module 153 acquires the user ID from the authenticator acquisition command. The authenticator management module 153 identifies, in the user management table 421, an entry that includes the user ID. The authenticator management module 153 sets the generated user authenticator in the user authenticator field of the identified entry. The authenticator management module 153 sends the generated user authenticator to the command/response processing module 151 ((4) in FIG. 16).

The command/response processing module 151 transmits, to the host 2 via the host I/F 11, a response that includes the user authenticator received from the authenticator management module 153 ((5) in FIG. 16).

Through the authenticator generation and transmission operation described above, the memory system 3 can generate the user authenticator and transmit the generated user authenticator to the host 2.

Figure 17:
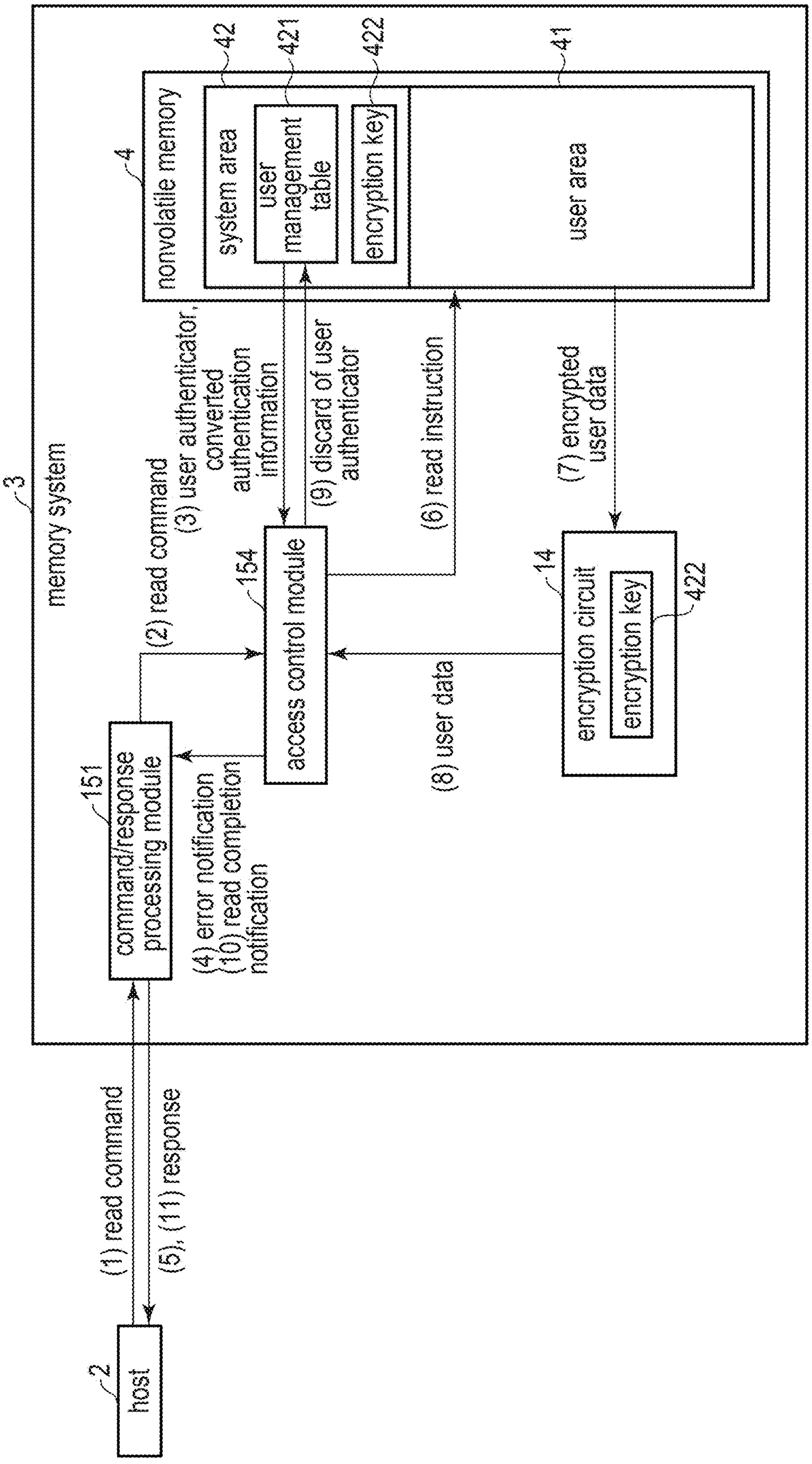
FIG. 17 is a diagram illustrating an example of a data read operation in the memory system according to the second embodiment.

FIG. 17 illustrates an example of a data read operation in the memory system 3.

Operations from (1) to (8) in FIG. 17 are the same as the operations from (1) to (8) in the data read operation described above with reference to FIG. 9.

After the encryption circuit 14 transmits the user data to the access control module 154 in (8) in FIG. 17, the access control module 154 discards the registered user authenticator from the user management table 421 ((9) in FIG. 17). Specifically, the access control module 154 identifies, in the user management table 421, an entry that includes the user ID. The access control module 154 deletes the registered user authenticator set in the user authenticator field of the identified entry. The access control module 154 then notifies the command/response processing module 151 that the reading of the user data has been completed ((10) in FIG. 17).

When the access control module 154 has notified that the reading of the user data has been completed, the command/response processing module 151 transmits the user data and a response indicating that the reading of the user data has been completed, to the host 2 ((11) in FIG. 17).

Through the data read operation described above, the memory system 3 can read user data from the user area 41 and provide the user data to the host 2 in response to a read command that includes an authentic access authenticator. The memory system 3 can also prohibit reading of user data in response to a read command that does not include an authentic access authenticator.

Figure 18:
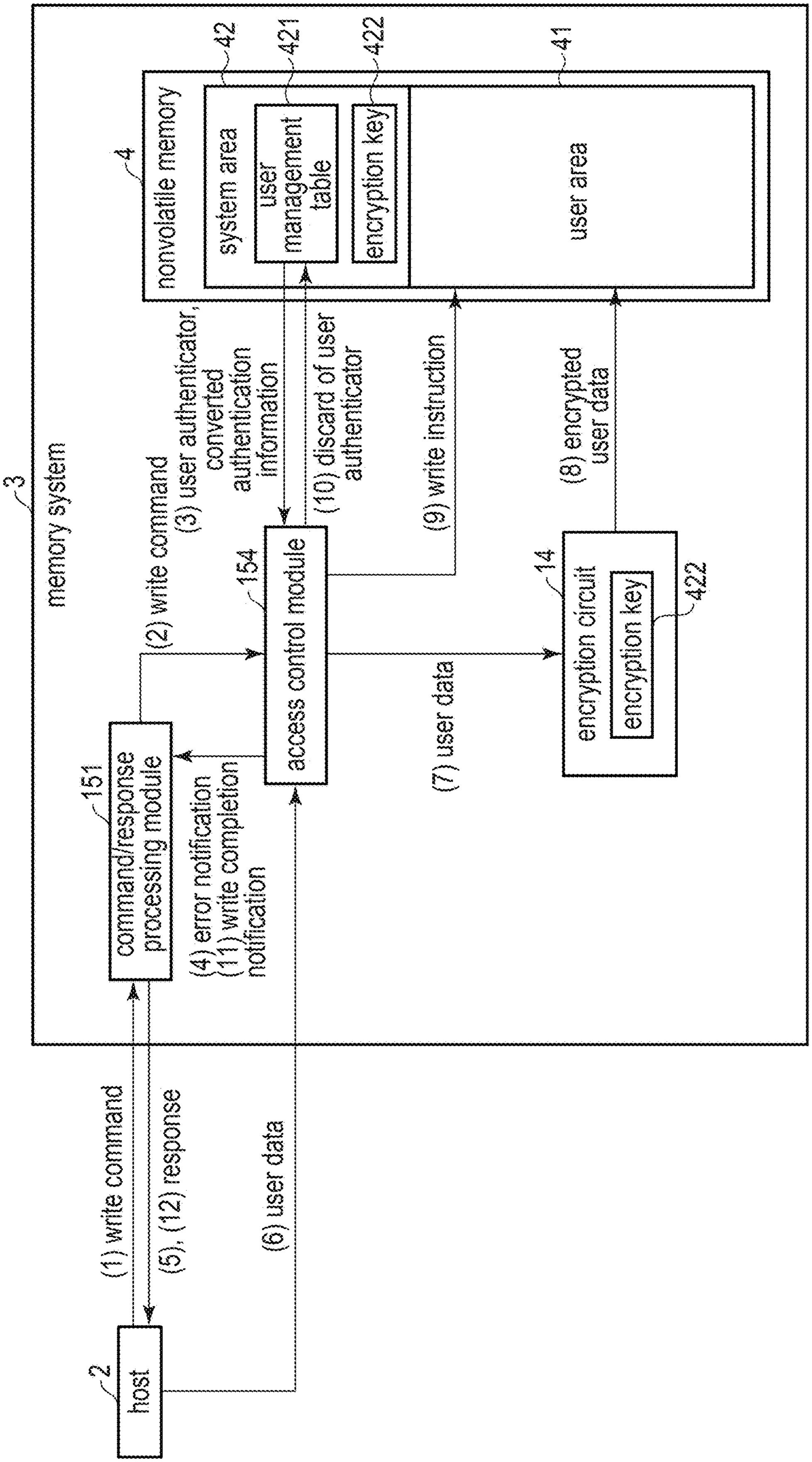
FIG. 18 is a diagram illustrating an example of a data write operation in the memory system according to the second embodiment.

FIG. 18 illustrates an example of a data write operation in the memory system 3.

Operations from (1) to (9) in FIG. 18 are the same as the operations from (1) to (9) in the data write operation described above with reference to FIG. 10.

After instructing writing of the encrypted data into the nonvolatile memory 4 and updating the logical-to-physical address conversion table 52 in (9) in FIG. 18, the access control module 154 discards the registered user authenticator from the user management table 421 ((10) in FIG. 18). Specifically, the access control module 154 identifies, in the user management table 421, an entry that includes the user ID. The access control module 154 deletes the registered user authenticator set in the user authenticator field of the identified entry. The access control module 154 then notifies the command/response processing module 151 that the writing of the user data has been completed ((11) in FIG. 18).

When the access control module 154 has notified that the writing of the user data has been completed, the command/response processing module 151 transmits a response indicating that the writing of the user data has been completed to the host 2 ((12) in FIG. 18).

Through the data write operation described above, the memory system 3 can write user data into the user area 41 in the nonvolatile memory 4 in accordance with a write command that includes an authentic access authenticator. In addition, the memory system 3 can prohibit writing of user data in accordance with a write command that does not include an authentic access authenticator.

Here, the procedure of a process executed in the host 2 will be described with reference to a flowchart of FIG. 19.

Figure 19:
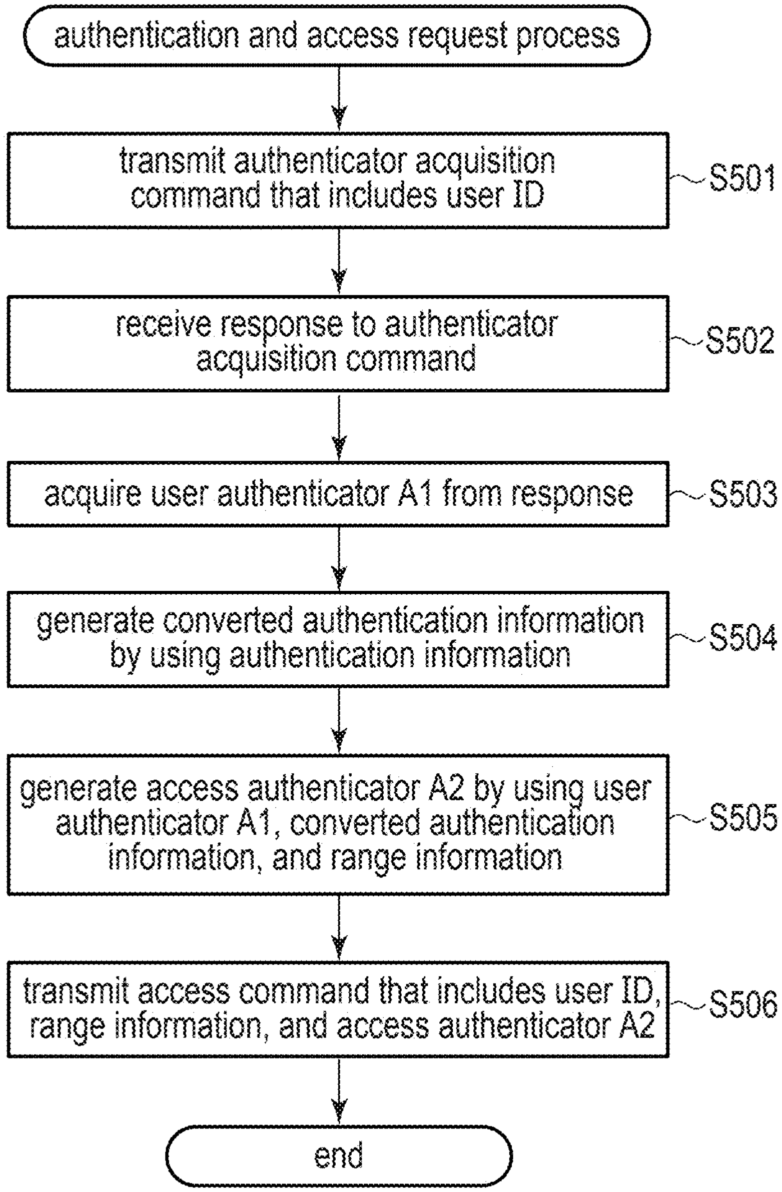
FIG. 19 is a flowchart illustrating an example of the procedure of an authenticator and access request process executed in the host, which is connected to the memory system according to the second embodiment.

FIG. 19 is a flowchart illustrating an example of the procedure of an authenticator and access request process executed by the CPU 21 of the host 2. The authenticator and access request process is a process of requesting the memory system 3 to generate a user authenticator and access the nonvolatile memory 4. The CPU 21 executes the authenticator and access request process, for example, in a case where it is necessary to access the nonvolatile memory 4.

First, the CPU 21 transmits an authenticator acquisition command that includes a user ID to the memory system 3 (step S501). The CPU 21 receives a response to the authenticator acquisition command from the memory system 3 (step S502). The CPU 21 then acquires a user authenticator (hereinafter, referred to as a user authenticator A1) from the received response (step S503).

Next, the CPU 21 performs the first calculation process on authentication information of the user, thereby generating converted authentication information (step S504). The converted authentication information is, for example, a hash value of the authentication information. The CPU 21 performs the second calculation process using the user authenticator A1, the converted authentication information, and range information, thereby generating an access authenticator (step S505). Hereinafter, this access authenticator is referred to as an access authenticator A2. For example, the access authenticator A2 is an exclusive-logical-OR of the user authenticator A1, the converted authentication information, and a start address of a target LBA range that is indicated by the range information. Then, the CPU 21 transmits an access command that includes the user ID, the range information, and the access authenticator A2 to the memory system 3 (step S506), and ends the authentication and access request process.

With the authenticator and access request process described above, the host 2 can access the nonvolatile memory 4 of the memory system 3 in a case where the user has authentic authority.

Next, the procedure of each of processes executed in the memory system 3 will be described with reference to flowcharts of FIG. 20 and FIG. 21.

Figure 20:
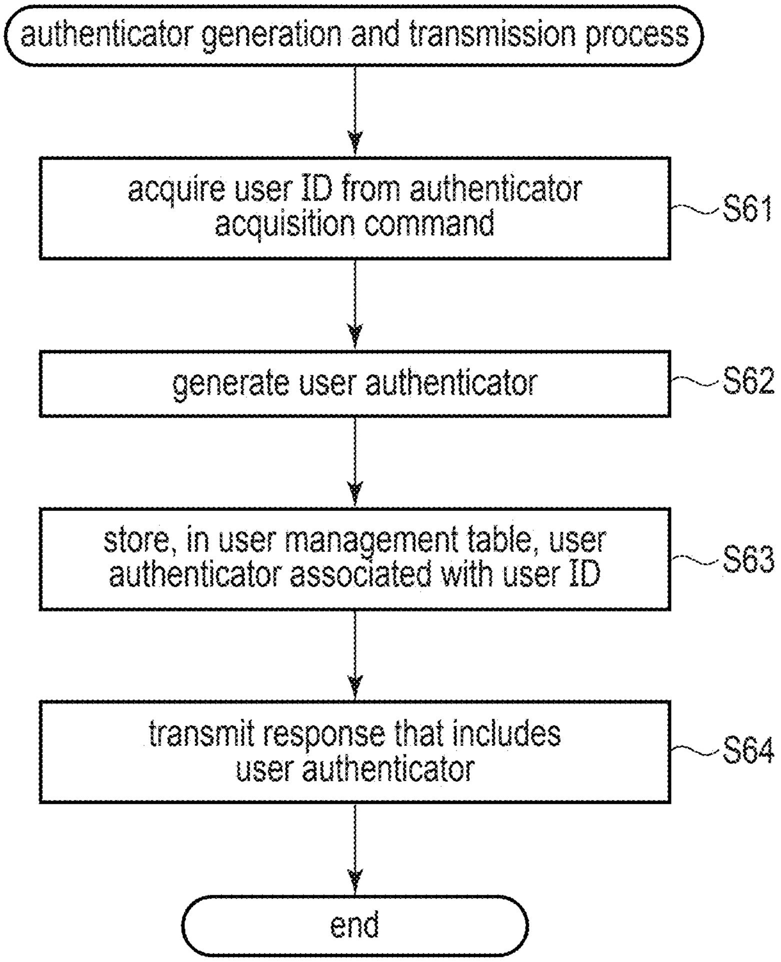
FIG. 20 is a flowchart illustrating an example of the procedure of an authenticator generation and transmission process executed in the memory system according to the second embodiment.

FIG. 20 is a flowchart illustrating an example of the procedure of an authenticator generation and transmission process executed by the CPU 15 of the memory system 3. The authenticator generation and transmission process is a process of generating a user authenticator and transmitting the user authenticator to the host 2. The CPU 15 executes the authenticator generation and transmission process in response to receiving an authenticator acquisition command from the host 2.

First, the CPU 15 acquires a user ID from the authenticator acquisition command (step S61). The CPU 15 also generates a user authenticator (step S62). The CPU 15 stores, in the user management table 421, the generated user authenticator associated with the user ID (step S63). Specifically, in the user management table 421, the CPU 15 sets the generated user authenticator in an entry that includes the user ID. The CPU 15 then transmits a response that includes the user authenticator to the host 2 (step S64), and ends the authenticator generation and transmission process.

Through the authenticator generation and transmission process described above, the memory system 3 can generate the user authenticator that corresponds to the user who is using the host 2 and provide the generated user authenticator to the host 2.

Figure 21:
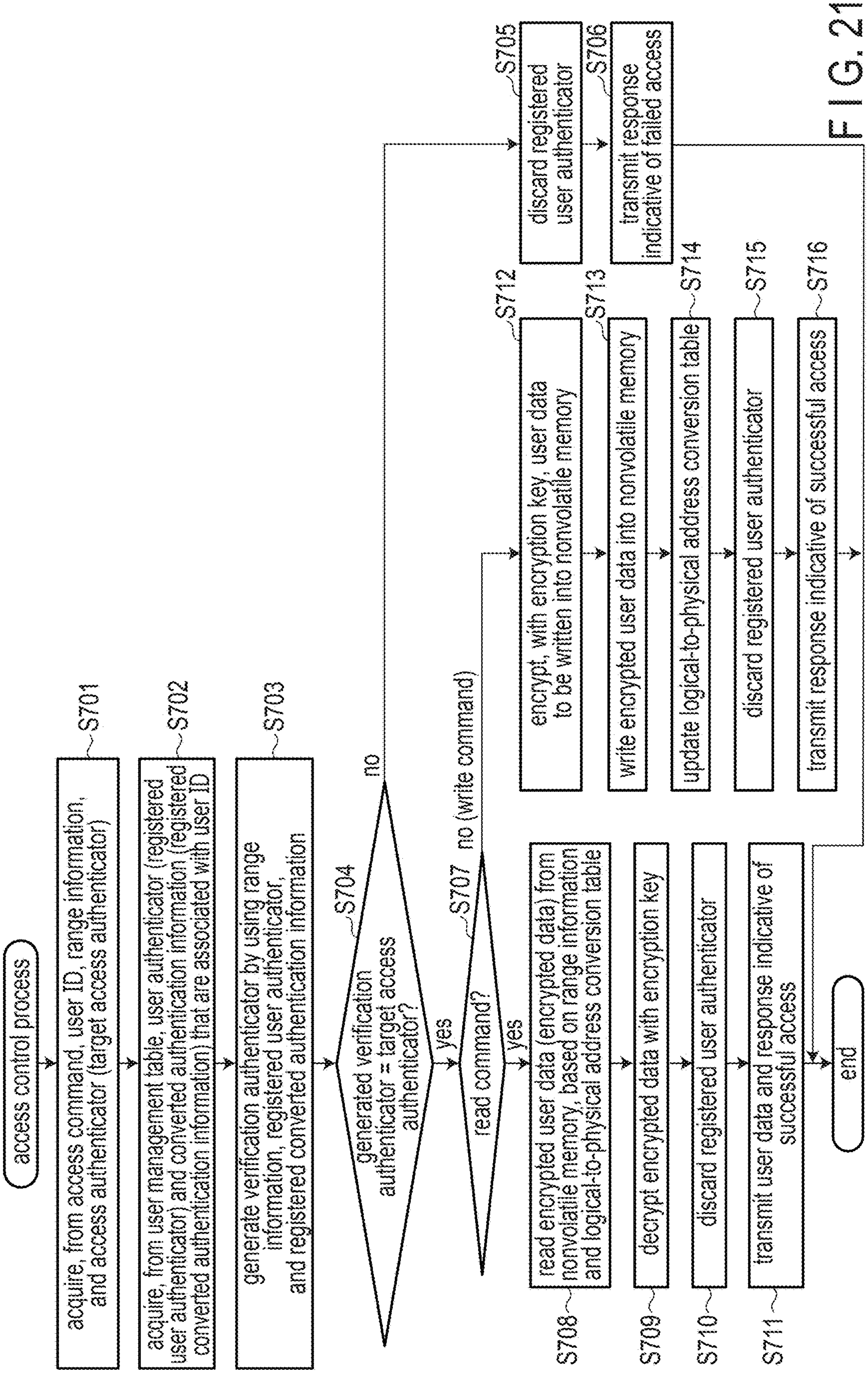
FIG. 21 is a flowchart illustrating an example of the procedure of an access control process executed in the memory system according to the second embodiment.

FIG. 21 is a flowchart illustrating an example of the procedure of an access control process executed by the CPU 15 of the memory system 3. The access control process is a process of controlling access to the nonvolatile memory 4 by the host 2 being used by a user with use of an access authenticator. The CPU 15 executes the access control process in response to receiving an access command from the host 2. Here, it is assumed that the access command is any of a read command and a write command.

The process from step S701 to step S704 illustrated in FIG. 21 is the same as the process from step S401 to step S404 of the access control process described above with reference to FIG. 14.

In a case where the generated verification authenticator is different from the target access authenticator (no in step S704), the CPU 15 discards the registered user authenticator from the user management table 421 (step S705). The CPU 15 then transmits a response indicating that the access has failed to the host 2 (step S706) and ends the access control process. That is, when having received, from the host 2, an access command that includes an access authenticator whose authenticity is not confirmed, the CPU 15 does not perform a process in accordance with the access command.

The process from step S707 to step S709 and the process from step S712 to step S714 are respectively the same as the process from step S406 to step S408 and the process from step S410 to step S412 of the access control process described above with reference to FIG. 14.

After generating the user data in step S709, the CPU 15 discards the registered user authenticator from the user management table 421 (step S710). The CPU 15 then transmits, to the host 2, the user data obtained by decryption and a response indicating that the access is successful (step S711), and ends the access control process.

Also, after updating the logical-to-physical address conversion table 52 in step S714, the CPU 15 discards the registered user authenticator from the user management table 421 (step S715). The CPU 15 then transmits a response indicating that the access is successful to the host 2 (step S716) and ends the access control process.

Through the access control process described above, the memory system 3 can control access to the nonvolatile memory 4 by the host 2 with use of the access authenticator. Furthermore, each time the memory system 3 executes the access control process, the memory system 3 discards the user authenticator. Therefore, the memory system 3 can enhance the security of access to the nonvolatile memory 4.

Third Embodiment

In the first embodiment, the memory system 3 performs authentication of a user in response to an authentication request command that includes authentication information. In a case where the authentication of the user is successful, the memory system 3 generates a user authenticator (registered user authenticator) that is associated with the user. The memory system 3 transmits the registered user authenticator to the host 2 in response to an authenticator acquisition command. Further, in a case where the authenticity of a target access authenticator in an access command has been confirmed, the memory system 3 executes a process in accordance with the access command.

In the second embodiment, the memory system 3 generates a user authenticator (registered user authenticator) and transmits the user authenticator to the host 2 in response to an authenticator acquisition command without receiving authentication information from the host 2. Also, in the same manner as in the first embodiment, the memory system 3 executes a process in accordance with an access command in a case where the authenticity of a target access authenticator has been confirmed.

In contrast to these first and second embodiments, a memory system 3 according to a third embodiment does not receive authentication information from a host 2 and does not transmit a user authenticator to the host 2. When having received an access command that includes a user ID and an access authenticator (target access authenticator), the memory system 3 confirms the authenticity of the target access authenticator by using authentication information associated with the user ID. When having confirmed the authenticity of the target access authenticator, the memory system 3 executes a process in accordance with the access command.

The configuration of the memory system 3 according to the third embodiment is the same as that of the memory system 3 in the first and second embodiments. The third embodiment is different from the first and second embodiments in the procedure of a process of confirming the authenticity of a target access authenticator included in an access command. In the following description, points different from those of the first and embodiments will be mainly explained.

Figure 22:
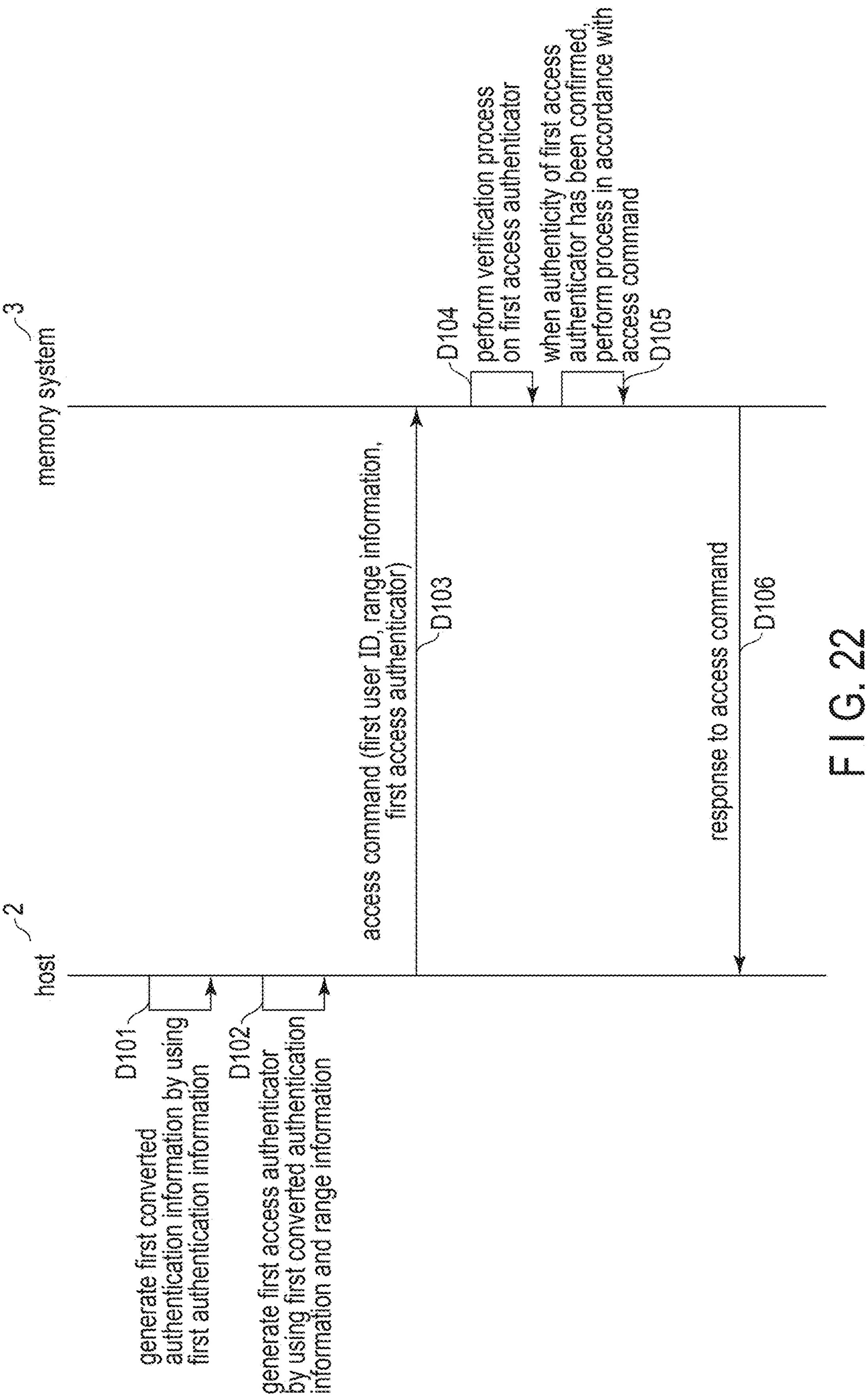
FIG. 22 is a sequence diagram illustrating an example of an access operation in a host and a memory system according to a third embodiment.

FIG. 22 is a sequence diagram illustrating an example of an access operation in the host 2 and the memory system 3. The access operation is an operation of permitting a user with authentic authority to access a range allocated to the user, but prohibiting access to this range by another user. Here, a case where a user using the host 2 is a first user with authentic authority will be explained.

First, the host 2 performs the first calculation process on authentication information of the first user (first authentication information), thereby generating converted authentication information (D101). Hereinafter, this converted authentication information is also referred to as first converted authentication information. The host 2 performs the second calculation process using the first converted authentication information and range information, thereby generating an access authenticator (D102). Hereinafter, this access authenticator is also referred to as a first access authenticator. The range information indicates, for example, a start address of an LBA range to be accessed by the host 2 (target LBA range) and the size of the target LBA range. The first access authenticator is, for example, an exclusive-logical-OR of the first converted authentication information and the start address of the target LBA range. Alternatively, the first access authenticator may be a hash value of data in which the first converted authentication information and the start address of the target LBA range are concatenated.

Then, the host 2 transmits an access command that requests access to the nonvolatile memory 4, to the memory system 3 (D103). The access command includes, for example, a first user ID, the range information, and the first access authenticator.

In response to the access command received from the host 2, the memory system 3 performs a verification process on the first access authenticator included in the access command (D104). The verification process is a process of verifying the authenticity of the first access authenticator.

Specifically, the memory system 3 acquires the first user ID, the range information, and the first access authenticator from the access command. The memory system 3 acquires converted authentication information associated with the acquired first user ID (hereinafter, also referred to as first registered converted authentication information) from the user management table 421. Note that the memory system 3 may acquire, based on the range information acquired from the access command, the first registered converted authentication information associated with range information indicative of an LBA range (region) that includes the target LBA range, from the user management table 421. The memory system 3 performs the second calculation process using the range information and the first registered converted authentication information, thereby generating a verification authenticator (hereinafter, also referred to as a first verification authenticator). For example, the first verification authenticator is an exclusive-logical-OR of the first registered converted authentication information and the start address of the target LBA range that is indicated by the range information. Alternatively, the first verification authenticator may be a hash value of data in which the start address of the target LBA range and the first registered converted authentication information are concatenated.

The memory system 3 then determines whether or not the authenticity of the first access authenticator has been confirmed depending on whether or not the first access authenticator matches the first verification authenticator. Here, it is assumed that the first access authenticator matches the first verification authenticator and thus the authenticity of the first access authenticator has been confirmed. Note that the memory system 3 may further determine whether or not the target LBA range is included in an LBA range permitted to be accessed by the first user.

When the authenticity of the first access authenticator has been confirmed, the memory system 3 performs a process in accordance with the access command (D105). The memory system 3 then transmits a response to the access command to the host 2 (D106).

Through the access operation described above, the memory system 3 can perform control so that only the first user with the authentic authority can access only the range permitted for the first user.

Specifically, the memory system 3 does not receive authentication information from the host 2 and does not transmit any user authenticator to the host 2. This prevents, for example, authentication information from leaking because of an authentication request command, which includes the authentication information, being sniffed, and a user authenticator from leaking because of a response, which includes the user authenticator, being sniffed.

In addition, as the access authenticator included in the access command, the first access authenticator obtained by performing the second calculation process using the first converted authentication information and the range information is used. In this case, another user who does not have authentic authentication information (in this case, the authentication information of the first user) cannot generate the first access authenticator correctly. Therefore, the memory system 3 can prevent access by said another user to the range allocated to the first user.

Furthermore, even in a case where the access command has been sniffed, since the first access authenticator is generated by using the first converted authentication information and the range information, the memory system 3 can prevent access to a range that is different from the range designated in the range information. In other words, the memory system 3 can prevent a replay attack on any area using the sniffed access command.

In this manner, even if one or more of commands and responses transferred between the memory system 3 and the host 2 used by the first user have been sniffed, the memory system 3 can prevent unauthorized access to the nonvolatile memory 4 with information obtained through the sniffing.

The CPU 15 of the memory system 3 functions as, for example, a command/response processing module 151 and an access control module 154.

The command/response processing module 151 receives, via the host I/F 11, a command issued by the host 2. The command issued by the host 2 is, for example, an access command. The command/response processing module 151 causes the access control module 154 to execute a process in accordance with the received command. The command/response processing module 151 also transmits a response based on the execution result of the process in accordance with the command, to the host 2 via the host I/F 11.

When the command/response processing module 151 has received an access command from the host 2, the access control module 154 controls access to the nonvolatile memory 4. The access command includes, for example, a user ID (target user ID), range information indicative of a target LBA range, and an access authenticator (target access authenticator).

Specifically, the access control module 154 verifies the authenticity of the target access authenticator by using the range information and registered authentication information that is associated with the target user ID. When the authenticity of the target access authenticator has been confirmed, the access control module 154 executes a process for the nonvolatile memory 4 in accordance with the access command. When the authenticity of the target access authenticator has not been confirmed, the access control module 154 does not execute the process for the nonvolatile memory 4 in accordance with the access command.

The verification of the authenticity of the target access authenticator will be described in more detail.

First, in response to the access command being received from the host 2, the access control module 154 obtains the target user ID, the range information, and the target access authenticator from the access command. The access control module 154 acquires registered authentication information associated with the target user ID from the user management table 421.

The access control module 154 verifies the authenticity of the target access authenticator by using the registered authentication information and the range information in the access command. Specifically, for example, the access control module 154 performs the first calculation process on the registered authentication information, thereby generating converted authentication information (registered converted authentication information). Note that, instead of generating the registered converted authentication information, the access control module 154 may acquire the registered converted authentication information associated with the target user ID from the user management table 421. That is, the registered converted authentication information may be generated and stored in the user management table 421 in advance. The access control module 154 then performs the second calculation process on the registered converted authentication information and a start address of the LBA range that is indicated by the range information, thereby generating a verification authenticator.

The access control module 154 then determines whether or not the authenticity of the target access authenticator has been confirmed depending on whether or not the generated verification authenticator matches the target access authenticator. That is, in a case where the generated verification authenticator matches the target access authenticator, the access control module 154 determines that the authenticity of the target access authenticator has been confirmed. In a case where the generated verification authenticator does not match the target access authenticator, the access control module 154 determines that the authenticity of the target access authenticator has not been confirmed.

With the configuration described above, the command/response processing module 151 and the access control module 154 can permit access to the nonvolatile memory 4 by a user with authentic authority but prohibit access to the nonvolatile memory 4 by a user without authentic authority.

The operations of the command/response processing module 151 and the access control module 154 will be explained in more detail, with reference to FIG. 23 and FIG. 24.

Figure 23:
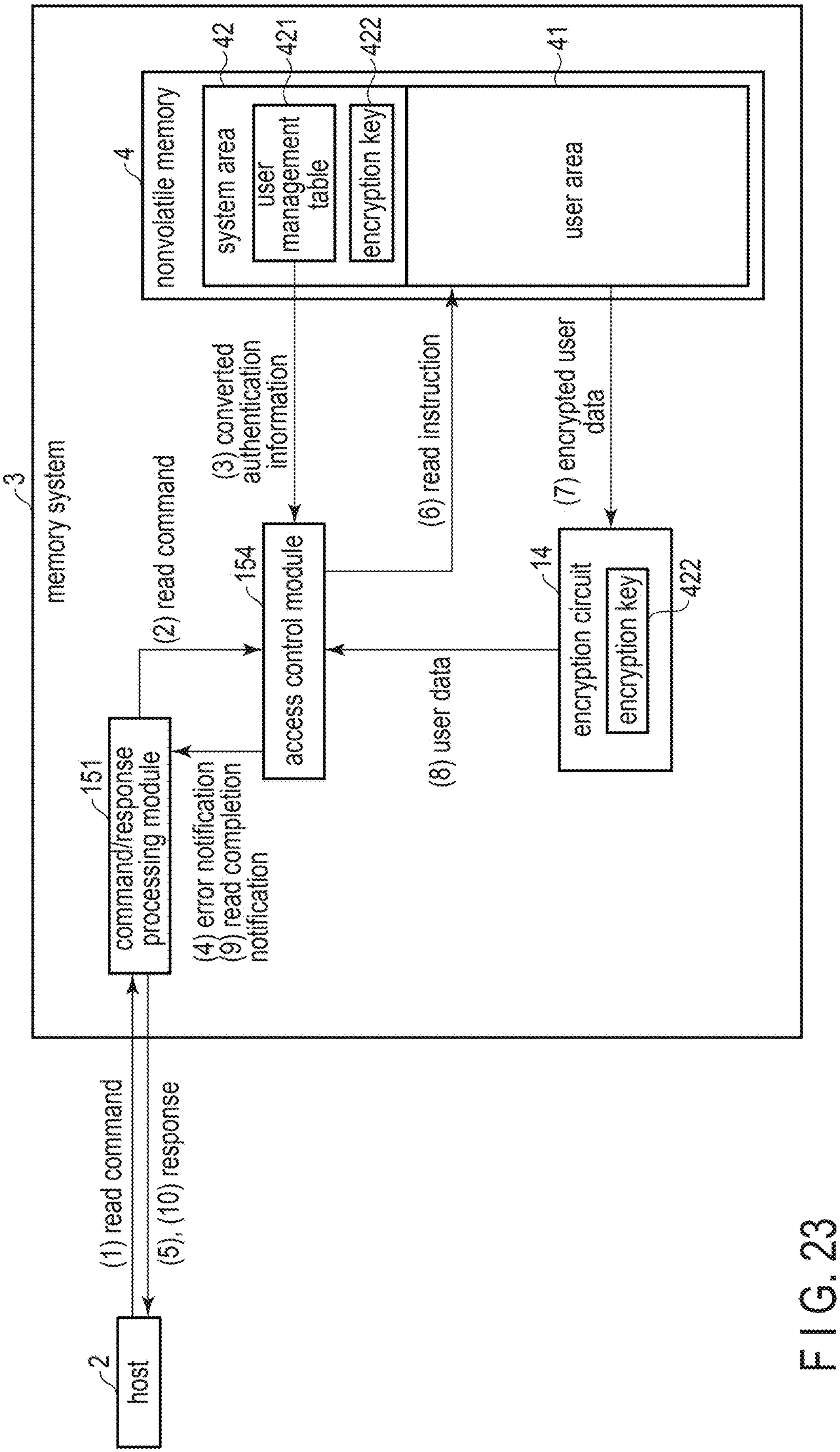
FIG. 23 is a diagram illustrating an example of a data read operation in the memory system according to the third embodiment.

FIG. 23 illustrates an example of a data read operation in the memory system 3.

First, a read command is transmitted from the host 2 to the memory system 3 ((1) in FIG. 23). Specifically, the host 2 performs the first calculation process on authentication information of a user, thereby generating converted authentication information. The host 2 performs the second calculation process using the converted authentication information and range information indicative of a target LBA range, thereby generating an access authenticator (target access authenticator). The host 2 then transmits a read command that includes a user ID, the range information, and the target access authenticator to the memory system 3.

In the memory system 3, the command/response processing module 151 receives the read command from the host 2 via the host I/F 11. The command/response processing module 151 sends the received read command to the access control module 154 ((2) in FIG. 23).

The access control module 154 acquires converted authentication information (registered converted authentication information) from the user management table 421, based on the user ID included in the read command ((3) in FIG. 23). Specifically, in the user management table 421, the access control module 154 identifies an entry that includes the user ID. The access control module 154 acquires the registered converted authentication information from the converted authentication information field of the identified entry.

The access control module 154 verifies the authenticity of the target access authenticator included in the read command by using the registered converted authentication information and the range information included in the read command. Specifically, the access control module 154 performs the second calculation process using the registered converted authentication information and the range information, thereby generating a verification authenticator. The generated verification authenticator is, for example, an exclusive-logical-OR of the registered converted authentication information and a start address of the target LBA range indicated by the range information. The access control module 154 determines whether or not the authenticity of the target access authenticator has been confirmed depending on whether or not the generated verification authenticator matches the target access authenticator.

Operations thereafter from (4) to (10) in FIG. 23 are the same as the operations from (4) to (10) in the data read operation described above with reference to FIG. 9.

Through the data read operation described above, the memory system 3 can read user data from the user area 41 in the nonvolatile memory 4 and provide the user data to the host 2 in accordance with a read command that includes an authentic access authenticator. Furthermore, the memory system 3 can prohibit reading of user data in accordance with a read command that does not include an authentic access authenticator.

Figure 24:
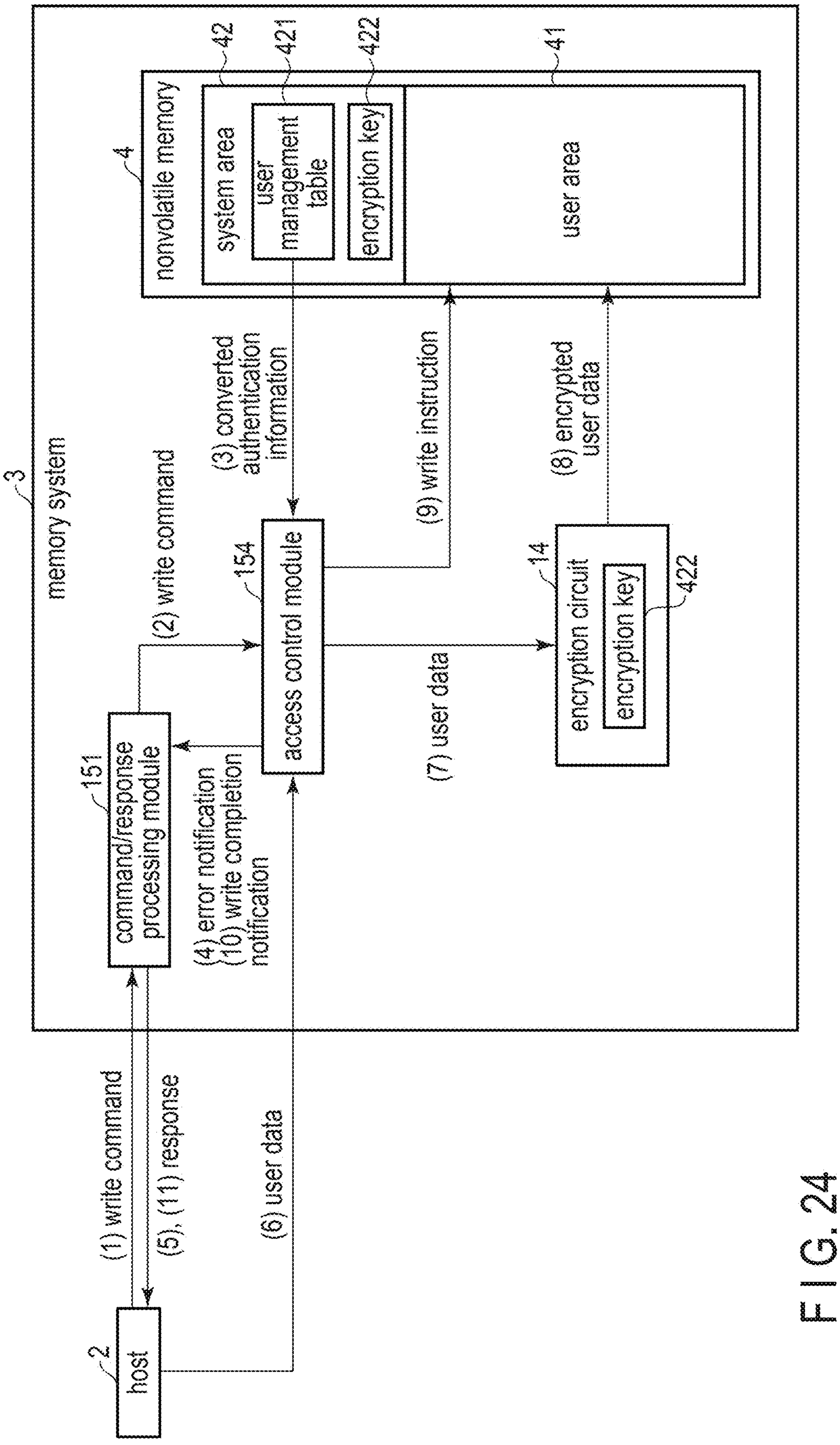
FIG. 24 is a diagram illustrating an example of a data write operation in the memory system according to the third embodiment.

FIG. 24 illustrates an example of a data write operation in the memory system 3.

First, a write command is transmitted from the host 2 to the memory system 3 ((1) in FIG. 24). Specifically, the host 2 performs the first calculation process on authentication information of a user, thereby generating converted authentication information. The host 2 performs the second calculation process using the converted authentication information and range information indicative of a target LBA range, thereby generating an access authenticator (target access authenticator). The host 2 then transmits a write command that includes a user ID, the range information, and the target access authenticator to the memory system 3.

In the memory system 3, the command/response processing module 151 receives the write command from the host 2 via the host I/F 11. The command/response processing module 151 sends the received write command to the access control module 154 ((2) in FIG. 24).

The access control module 154 acquires converted authentication information (registered converted authentication information) from the user management table 421, based on the user ID included in the write command ((3) in FIG. 24). Specifically, in the user management table 421, the access control module 154 identifies an entry that includes the user ID. The access control module 154 acquires the registered converted authentication information from the converted authentication information field of the identified entry.

The access control module 154 verifies the authenticity of the target access authenticator included in the write command by using the registered converted authentication information and the range information included in the write command. Specifically, the access control module 154 performs the second calculation process using the registered converted authentication information and the range information, thereby generating a verification authenticator. The generated verification authenticator is, for example, an exclusive-logical-OR of the registered converted authentication information and a start address of the target LBA range indicated by the range information. The access control module 154 determines whether or not the authenticity of the target access authenticator has been confirmed depending on whether or not the generated verification authenticator matches the target access authenticator.

Operations thereafter from (4) to (11) in FIG. 24 are the same as the operations from (4) to (11) in the data write operation described above with reference to FIG. 10.

Through the data write operation described above, the memory system 3 can write user data into the user area 41 in the nonvolatile memory 4 in accordance with a write command that includes an authentic access authenticator. In addition, the memory system 3 can prohibit writing of user data in accordance with a write command that does not include an authentic access authenticator.

Here, the procedure of a process executed in the host 2 will be described with reference to a flowchart of FIG. 25.

Figure 25:
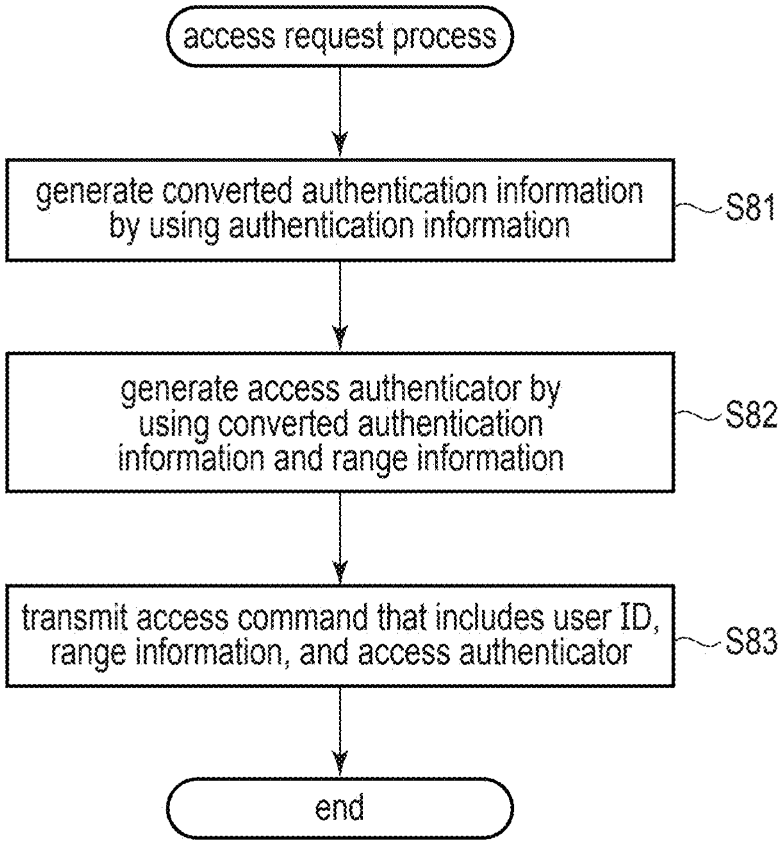
FIG. 25 is a flowchart illustrating an example of the procedure of an access request process executed in the host, which is connected to the memory system according to the third embodiment.

FIG. 25 is a flowchart illustrating an example of the procedure of an access request process executed by the CPU 21 of the host 2. The access request process is a process of requesting the memory system 3 to access the nonvolatile memory 4. The CPU 21 executes the access request process in a case where it needs to access the nonvolatile memory 4, for example.

First, the CPU 21 performs the first calculation process on authentication information of a user, thereby generating converted authentication information (step S81). Next, the CPU 21 performs the second calculation process using the converted authentication information and range information indicative of a target LBA range, thereby generating an access authenticator (step S82). The CPU 21 then transmits an access command that includes a user ID, the range information, and the access authenticator to the memory system 3 (step S83) and ends the access request process.

Through the access request process described above, the host 2 can access the nonvolatile memory 4 of the memory system 3 in a case where the user has authentic authority.

Next, the procedure of a process executed in the memory system 3 will be described with reference to a flowchart of FIG. 26.

Figure 26:
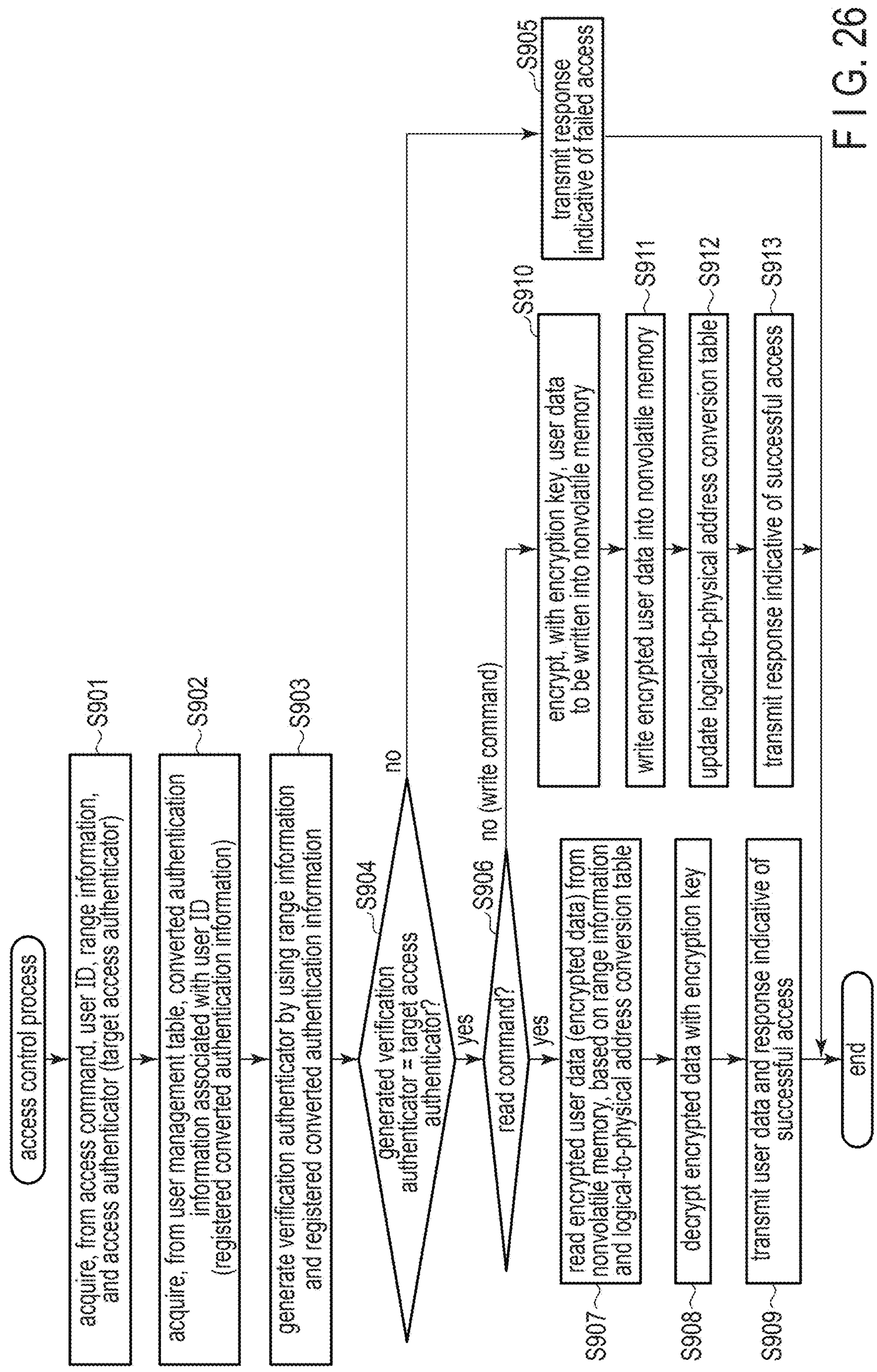
FIG. 26 is a flowchart illustrating an example of the procedure for an access control process executed in the memory system according to the third embodiment.

FIG. 26 is a flowchart illustrating an example of the procedure of an access control process executed by the CPU 15 of the memory system 3. The access control process is a process of controlling access to the nonvolatile memory 4 by the host 2 being used by a user, with use of an access authenticator. The CPU 15 executes the access control process in response to receiving an access command from the host 2. Here, it is assumed that the access command is any of a read command and a write command.

First, the CPU 15 acquires a user ID, range information indicative of a target LBA range, and an access authenticator (target access authenticator) from the access command (step S901). The CPU 15 acquires converted authentication information associated with the acquired user ID, from the user management table 421 (step S902). The CPU 15 performs the second calculation process using the range information and the converted authentication information, thereby generating a verification authenticator (step S903). The CPU 15 then determines whether or not the generated verification authenticator matches the target access authenticator (step S904). In other words, the CPU 15 determines whether the authenticity of the target access authenticator has been confirmed or not.

The process thereafter from step S905 to step S913 is the same as the process from step S405 to step S413 of the access control process described above with reference to FIG. 14.

Through the access control process described above, the memory system 3 can control the access to the nonvolatile memory 4 by the host 2, with use of the access authenticator. Specifically, in a case where the authenticity of the access authenticator included in the access command has been confirmed, the memory system 3 executes a process in accordance with the access command. In contrast, in a case where the authenticity of the access authenticator included in the access command has not been confirmed, the memory system 3 does not execute the process in accordance with the access command. In this manner, the memory system 3 can permit execution of a process in accordance with an access command that includes an authentic access authenticator, but prohibit execution of a process in accordance with an access command that does not include an authentic access authenticator. Therefore, the memory system 3 can enhance the security of access to the nonvolatile memory 4.

As explained above, the first, second, and third embodiments can enhance security of access to a storage.

The authentication processing module 152 manages first authentication information (registered authentication information) associated with a first user ID. The authenticator management module 153 generates a first authenticator (registered user authenticator) associated with the first user ID. The command/response processing module 151 and the authenticator management module 153 transmit the first authenticator to the host 2. The command/response processing module 151 receives an access command that includes the first user ID and a second authenticator (target access authenticator). The access control module 154 verifies the authenticity of the second authenticator by using at least the first authentication information and the first authenticator. When the authenticity of the second authenticator has been confirmed, the access control module 154 executes a first process for the nonvolatile memory 4 in accordance with the access command. When the authenticity of the second authenticator has not been confirmed, the access control module 154 does not execute the first process in accordance with the access command.

With the configuration described above, on the basis of the verification result of the authenticity of the access authenticator included in the access command, the memory system 3 permits access to the nonvolatile memory 4 by a user with authentic authority, but prohibits access to the nonvolatile memory 4 by a user without authentic authority. Therefore, the memory system 3 can enhance the security of access to the nonvolatile memory 4.

Each of the various functions described in the first to third embodiments may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiments may be realized in a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:

a nonvolatile memory; and a controller electrically connected to the nonvolatile memory and configured to:

communicate with a host;

manage first authentication information associated with first user identification information;

generate a first authenticator associated with the first user identification information;

transmit the first authenticator to the host;

receive a first access command that includes the first user identification information and a second authenticator;

verify authenticity of the second authenticator by using at least the first authentication information and the first authenticator;

when the authenticity of the second authenticator has been confirmed, execute a first process for the nonvolatile memory in accordance with the first access command; and when the authenticity of the second authenticator has not been confirmed, not execute the first process in accordance with the first access command, wherein the first access command further includes range information indicative of a logical address range to be accessed in accordance with the first access command, and the controller is configured to verify the authenticity of the second authenticator by using the first authentication information, the first authenticator, and the range information.

2. The memory system according to claim 1, wherein the controller is configured to generate the first authenticator that includes a random number.

3. The memory system according to claim 1, wherein the controller is further configured to:

receive, from the host, an authentication request command that includes the first user identification information and second authentication information;

in response to the second authentication information matching the first authentication information, generate the first authenticator;

receive, from the host, an authenticator acquisition command that includes the first user identification information; and transmit, to the host, a response to the authenticator acquisition command that includes the first authenticator.

4. The memory system according to claim 3, wherein the controller is further configured to, in response to the second authentication information matching the first authentication information, transmit, to the host, a response that includes information indicating that an authentication process using the second authentication information is successful and that does not include the first authenticator.

5. The memory system according to claim 1, wherein the controller is further configured to:

generate first converted authentication information by performing a first calculation process on the first authentication information;

generate a third authenticator by performing a second calculation process using at least the first converted authentication information and the first authenticator;

in response to the second authenticator matching the third authenticator, determine that the authenticity of the second authenticator has been confirmed; and in response to the second authenticator not matching the third authenticator, determine that the authenticity of the second authenticator has not been confirmed.

6. The memory system according to claim 5, wherein the first access command further includes range information indicative of a logical address range to be accessed in accordance with the first access command, and the controller is configured to:

generate the third authenticator by performing the second calculation process using the first converted authentication information, the first authenticator, and the range information.

7. The memory system according to claim 6, wherein the range information includes at least a start address of the logical address range, and the controller is configured to generate the third authenticator by performing the second calculation process on the first converted authentication information, the first authenticator, and the start address.

8. The memory system according to claim 7, wherein the controller is configured to execute the first calculation process that includes a calculation process using a first hash function.

9. The memory system according to claim 8, wherein the controller is configured to execute the second calculation process that includes either a process of an exclusive-logical-OR operation or a calculation process using a second hash function.

10. The memory system according to claim 1, wherein the controller is further configured to:

receive, from the host, an authenticator acquisition command that includes the first user identification information;

in response to the received authenticator acquisition command, generate the first authenticator and transmit the first authenticator to the host;

receive a second access command that includes the first user identification information and the second authenticator;

verify the authenticity of the second authenticator by using the first authentication information and the first authenticator;

when the authenticity of the second authenticator has been confirmed, execute a second process for the nonvolatile memory in accordance with the second access command; and when the authenticity of the second authenticator has not been confirmed, not execute the second process.

11. The memory system according to claim 10, wherein the second authenticator is generated by using at least second authentication information that is associated with the first user identification information, and the authenticator acquisition command does not include the second authentication information.

12. The memory system according to claim 10, wherein the controller is further configured to discard the first authenticator after determining that the authenticity of the second authenticator has been confirmed or that the authenticity of the second authenticator has not been confirmed.

13. The memory system of according to claim 1, wherein the controller is configured to transmit, to the host, a response indicative of an error in a case where the first process in accordance with the first access command is not executed.

14. The memory system according to claim 1, wherein the first process includes a process of reading data from the nonvolatile memory or a process of writing data into the nonvolatile memory, and the controller is further configured to manage an encryption key associated with the first user identification information, and the first process includes:

a process of reading encrypted data from the nonvolatile memory and decrypting the read encrypted data with the encryption key; or a process of generating encrypted data by encrypting, with the encryption key, data to be written into the nonvolatile memory and writing the generated encrypted data into the nonvolatile memory.

15. A memory system comprising:

a nonvolatile memory; and a controller electrically connected to the nonvolatile memory and configured to:

communicate with a host;

manage first authentication information associated with first user identification information;

receive, from the host, a first access command that includes the first user identification information, range information, and a fourth authenticator;

verify authenticity of the fourth authenticator by using at least the first authentication information and the range information;

when the authenticity of the fourth authenticator has been confirmed, execute a first process for the nonvolatile memory in accordance with the first access command; and when the authenticity of the fourth authenticator has not been confirmed, not execute the first process in accordance with the first access command, wherein the range information included in the first access command being indicative of a logical address range to be accessed in accordance with the first access command, and the controller is configured to verify the authenticity of the fourth authenticator by using the first authentication information, the fourth authenticator, and the range information.

16. The memory system according to claim 15, wherein the controller is configured to:

generate a fifth authenticator by performing a calculation process using at least the first authentication information and the range information;

in response to the fourth authenticator matching the fifth authenticator, determine that the authenticity of the fourth authenticator has been confirmed; and in response to the fourth authenticator not matching the fifth authenticator, determine that the authenticity of the fourth authenticator has not been confirmed.

17. The memory system according to claim 16, wherein the range information includes at least a start address of a logical address range to be accessed in accordance with the first access command, and the controller is configured to generate the fifth authenticator by performing the calculation process on the first authentication information and the start address.

18. The memory system of according to claim 15, wherein the controller is configured to transmit, to the host, a response indicative of an error in a case where the first process in accordance with the first access command is not executed.

19. The memory system according to claim 15, wherein the first process includes a process of reading data from the nonvolatile memory or a process of writing data into the nonvolatile memory, and the controller is further configured to manage an encryption key associated with the first user identification information, and the first process includes:

a process of reading encrypted data from the nonvolatile memory and decrypting the read encrypted data with the encryption key; or a process of generating encrypted data by encrypting, with the encryption key, data to be written into the nonvolatile memory and writing the generated encrypted data into the nonvolatile memory.

* * * * *